United States Patent
Bhattacharya et al.

(10) Patent No.: US 10,064,199 B2
(45) Date of Patent: Aug. 28, 2018

(54) TECHNIQUES FOR SYSTEM INFORMATION BLOCK (SIB) MANAGEMENT USING SIB RESOURCE BLOCK ALLOCATION AND PHYSICAL DOWNLINK SHARED CHANNEL (PDSCH) DATA RESOURCE BLOCK BLANKING

(71) Applicant: QUALCOMM Incorporated, San Diego, CA (US)

(72) Inventors: Arunoday Bhattacharya, Sunnyvale, CA (US); Vidyadhar Adiraju, San Diego, CA (US); Kausik Ray Chaudhuri, San Diego, CA (US); Chintan Pravin Turakhia, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 15/197,382

(22) Filed: Jun. 29, 2016

(65) Prior Publication Data
US 2017/0099670 A1  Apr. 6, 2017

Related U.S. Application Data

(60) Provisional application No. 62/238,043, filed on Oct. 6, 2015.

(51) Int. Cl.
*H04W 72/08* (2009.01)
*H04L 12/26* (2006.01)
(Continued)

(52) U.S. Cl.
CPC ........... *H04W 72/082* (2013.01); *H04L 43/16* (2013.01); *H04W 48/08* (2013.01); *H04W 72/042* (2013.01); *H04W 72/0446* (2013.01)

(58) Field of Classification Search
CPC . H04W 48/08; H04W 72/042; H04W 72/082; H04W 48/0446; H04L 43/16
See application file for complete search history.

(56) References Cited

U.S. PATENT DOCUMENTS 8,750,887 B2  6/2014  Chandrasekhar et al.
8,837,301 B2  9/2014  Krishnamurthy
(Continued)

FOREIGN PATENT DOCUMENTS

WO  WO2014/126573  *  8/2014
WO  WO-2014/126573 A1  8/2014

OTHER PUBLICATIONS

International Search Report and Written Opinion issued in International Application No. PCT/US2016/054766 dated Dec. 16, 2016.

*Primary Examiner* — Mewale Ambaye
(74) *Attorney, Agent, or Firm* — Arent Fox LLP

(57) ABSTRACT

Aspects of system information block (SIB) management during wireless communication include assigning a cell controlled by a network entity to a cell group based on at least one interference parameter of the cell, wherein the cell group is one of a plurality of cell groups into which each cell in the wireless network is assigned based on a respective interference parameter of each cell. The SIB management further includes identifying, within a subframe, one or more SIB resource blocks (RBs) in which a SIB transmission is scheduled for other cells in the cell group. In addition, the SIB management includes halting, at the network entity, one or more non-SIB RB transmissions of the cell in the identified one or more SIB RBs in the subframe in which the SIB transmission is scheduled for the other cells in the cell group.

30 Claims, 16 Drawing Sheets

(51) Int. Cl.
*H04W 72/04* (2009.01)
*H04W 48/08* (2009.01)

(56) References Cited

U.S. PATENT DOCUMENTS

| | | |
|---|---|---|
| 2013/0044685 A1* | 2/2013 | Fong .................... H04J 11/0053 370/328 |
| 2013/0114517 A1 | 5/2013 | Blankenship et al. |
| 2013/0229972 A1 | 9/2013 | Lee et al. |
| 2015/0049683 A1 | 2/2015 | Barbieri et al. |
| 2015/0109932 A1 | 4/2015 | Goldhamer |
| 2015/0208263 A1 | 7/2015 | Behravan et al. |
| 2016/0006529 A1 | 1/2016 | Yi et al. |

\* cited by examiner

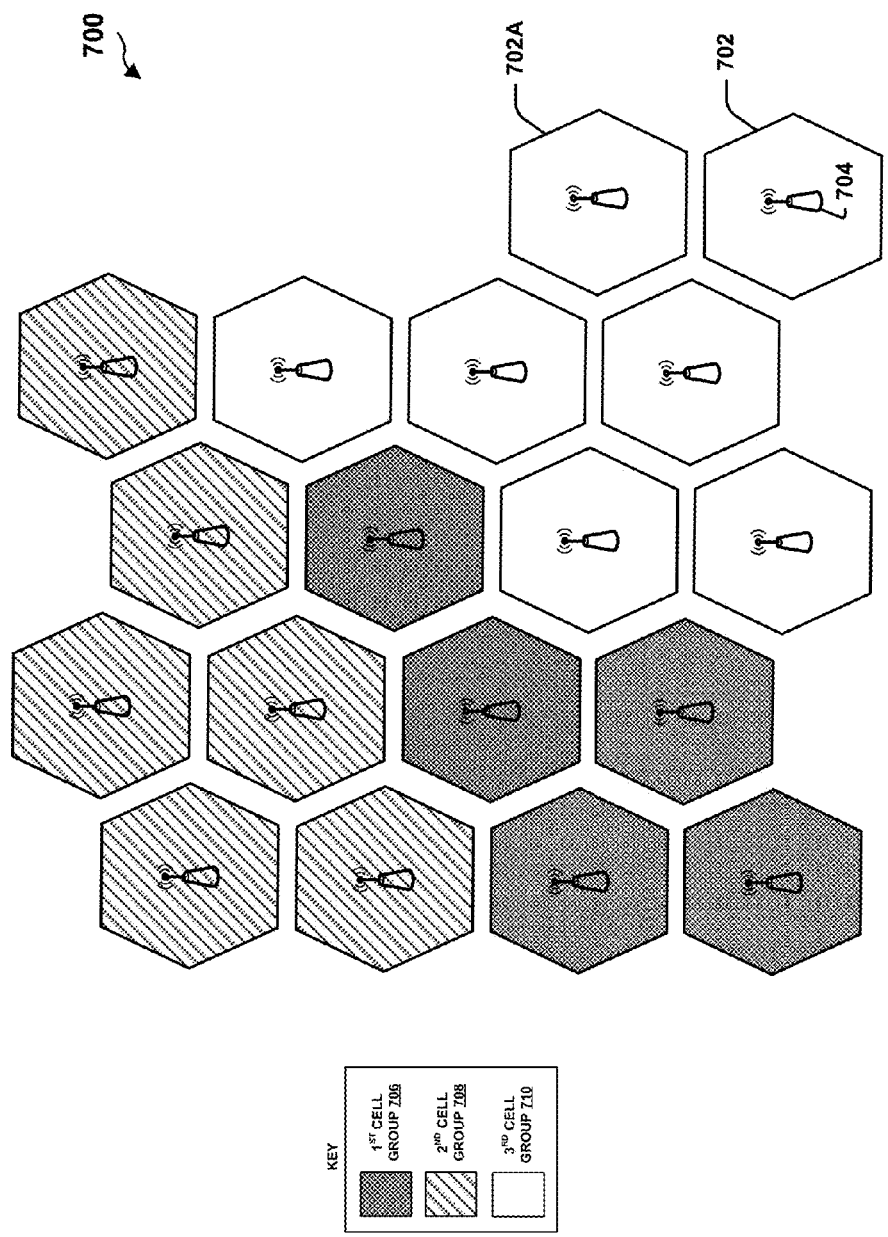

TECHNIQUES FOR SYSTEM INFORMATION BLOCK (SIB) MANAGEMENT USING SIB RESOURCE BLOCK ALLOCATION AND PHYSICAL DOWNLINK SHARED CHANNEL (PDSCH) DATA RESOURCE BLOCK BLANKING

CROSS-REFERENCE TO RELATED APPLICATIONS

The present Application for Patent claims priority to U.S. Provisional Application No. 62/238,043 entitled "TECHNIQUES FOR SYSTEM INFORMATION BLOCK MANAGEMENT USING SIB RESOURCE BLOCK ALLOCATION AND PDSCH DATA RESOURCE BLOCK BLANKING" filed Oct. 6, 2015, which is assigned to the assignee hereof and hereby expressly incorporated by reference herein.

INTRODUCTION

The present disclosure relates generally to communication systems, and more particularly, to a system information block (SIB) transmission and management in a wireless communication system.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

Furthermore in existing wireless communication systems, mandatory SIB read failures at user equipment (UE) constitute a leading cause of radio link failures, especially in urban environments and high capacity venues due to strong coverage overlap and physical cell identifiers (PCI) pollution. Radio link failures may result in high recovery delay due to limited context fetch support and pre-emptive evolved Node B (eNodeB) context release. These radio link failures can result in a UE camping on a cell that communicates according to one or more outdated wireless communication protocols, which can have a negative effect on user experience.

As such, improvements in SIB management and communication thereof between network entities and UEs are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a present method relates to SIB management during wireless communications. The described aspects include assigning a cell controlled by a network entity to a cell group based on at least one interference parameter of the cell, wherein the cell group is one of a plurality of cell groups into which each cell in the wireless network is assigned based on a respective interference parameter of each cell. The described aspects further include identifying, within a subframe, one or more SIB RBs in which a SIB transmission is scheduled for other cells in the cell group. The described aspects further include halting, at the network entity, one or more non-SIB RB transmissions of the cell in the identified one or more SIB RBs in the subframe in which the SIB transmission is scheduled for the other cells in the cell group.

In another aspect, a present computer-readable medium storing computer executable code relates to SIB management during wireless communications. The described aspects include code for assigning a cell controlled by a network entity to a cell group based on at least one interference parameter of the cell, wherein the cell group is one of a plurality of cell groups into which each cell in the wireless network is assigned based on a respective interference parameter of each cell. The described aspects further include code for identifying, within a subframe, one or more SIB RBs in which a SIB transmission is scheduled for other cells in the cell group. The described aspects further include code for halting, at the network entity, one or more non-SIB RB transmissions of the cell in the identified one or more SIB RBs in the subframe in which the SIB transmission is scheduled for the other cells in the cell group.

In a further aspect, a present apparatus relates to SIB management during wireless communications. The described aspects include means for assigning a cell controlled by a network entity to a cell group based on at least one interference parameter of the cell, wherein the cell group is one of a plurality of cell groups into which each cell in the wireless network is assigned based on a respective interference parameter of each cell. The described aspects further include means for identifying, within a subframe, one or more SIB RBs in which a SIB transmission is scheduled for other cells in the cell group. The described aspects further include means for halting, at the network entity, one or more non-SIB RB transmissions of the cell in the identified one or more SIB RBs in the subframe in which the SIB transmission is scheduled for the other cells in the cell group.

In another aspect, a present apparatus relates to SIB management during wireless communications. The described aspects include a memory configured to store instructions, and one or more processors communicatively coupled with the memory, wherein the one or more processors and the memory are configured to assign a cell controlled by a network entity to a cell group based on at least one interference parameter of the cell, wherein the cell group is one of a plurality of cell groups into which each cell in the wireless network is assigned based on a respective interference parameter of each cell. The described aspects further identify, within a subframe, one or more SIB RBs in which a SIB transmission is scheduled for other cells in the cell group. The described aspects further halt, at the network entity, one or more non-SIB RB transmissions of the cell in the identified one or more SIB RBs in the subframe in which the SIB transmission is scheduled for the other cells in the cell group.

In accordance with another aspect, a present method relates to SIB management during wireless communications. The described aspects include determining a group of cells from a set of cells. The described aspects further include identifying one or more RBs to blank from a downlink channel associated with the group of cells. The described aspects further include placing SIBs in locations within the group of cells based on the one or more RBs blanked from the downlink channel.

In another aspect, a present computer-readable medium storing computer executable code relates to SIB management during wireless communications. The described aspects include code for determining a group of cells from a set of cells. The described aspects further include code for identifying one or more RBs to blank from a downlink channel associated with the group of cells. The described aspects further include code for placing SIBs in locations within the group of cells based on the one or more RBs blanked from the downlink channel.

In a further aspect, a present apparatus relates to SIB management during wireless communications. The described aspects include means for determining a group of cells from a set of cells. The described aspects further include means for identifying one or more RBs to blank from a downlink channel associated with the group of cells. The described aspects further include means for placing SIBs in locations within the group of cells based on the one or more RBs blanked from the downlink channel.

In another aspect, a present apparatus relates to SIB management during wireless communications. The described aspects include a memory configured to store instructions, and one or more processors communicatively coupled with the memory, wherein the one or more processors and the memory are configured to determine a group of cells from a set of cells. The described aspects further identify one or more RBs to blank from a downlink channel associated with the group of cells. The described aspects further placing SIBs in locations within the group of cells based on the one or more RBs blanked from the downlink channel.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

The accompanying drawings are presented to aid in the description of various aspects of the disclosure and are provided solely for illustration of the aspects and not limitation thereof. The drawings include like reference numbers for like elements, and may represent optional components or actions using dashed lines.

FIG. 7 is a diagram illustrating an example grouping of a set of cells into a plurality of cell groups based on at least one interference parameter according to the present disclosure.

DETAILED DESCRIPTION

Figure 1:
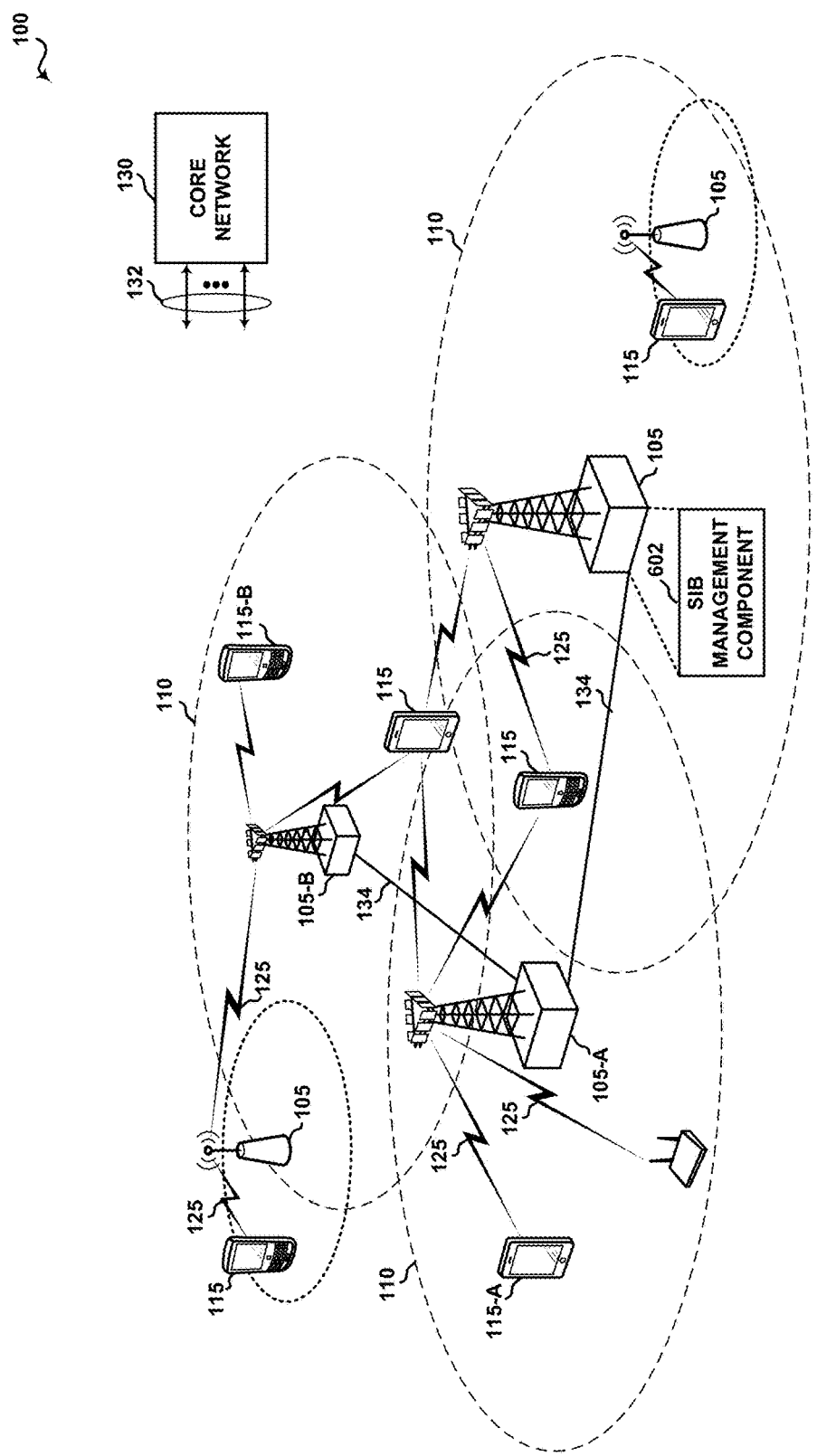
FIG. 1 shows a block diagram conceptually illustrating an example of a telecommunications system, in accordance with an aspect of the present disclosure.

The present disclosure presents example methods and apparatus for improving SIB decode performance. For example, aspects of the present disclosure include dividing a set of cells into cell groups based on one or more interference parameters associated with the set of cells, and particularly, the individual interference parameters of the cells therein. In some examples, this grouping operation may involve executing a coordinated cell grouping algorithm at each of the network entities (e.g., eNBs, base stations, etc.) that control each of the set of cells. As such, the coordinated cell grouping algorithm is configured to, when executed, create and/or populate the plurality of cell groups based on the one or more interference parameters. In some examples, the interference parameters may be indicative of interference associated with a cell or a set of cells and may be measured by one or more of the network entities associated with the set of cells. The one or more network entities may then share its measured interference parameters with the other network entities associated with the cell and/or other cells of the set of cells and the coordinated cell grouping algorithm may be executed based on these shared interference parameters. As a result, the network entities associated with a set of cells may intelligently group the cells in such a way that minimizes transmission interference for the individual cells and within the set of cells.

In an additional aspect, the present disclosure provides a mechanism for coordinating SIB and non-SIB RB transmissions in a subframe for each of the cells in any given cell group that is created and/or populated, for instance, by execution of the coordinated cell grouping algorithm. In an aspect, this mechanism may include determining to halt one or more non-SIB RB transmissions (e.g., Physical Downlink Shared Channel (PDSCH) transmissions) in a subframe for one or more cells of a cell group, for instance, when such a transmission would collide with a SIB transmission in the cell group during the same subframe. Specifically, in some examples presented herein, each network entity in the cell group may obtain a number of SIB resource blocks in the cell group over which an SIB transmission is scheduled during a subframe. Based on a comparison of this number of SIB resource blocks to a threshold value, a network entity may compile a set of scheduled non-SIB RB transmissions to halt during the subframe. By intelligently halting one or more non-SIB RB transmissions, the network entities associated with the cells of any cell group can minimize the probability that a non-SIB RB transmission could interfere with a SIB transmission by a network entity during the subframe, thereby increasing the probability of successful SIB reception at one or more UEs in communication with a transmitting network entity.

In a further example aspect, each of the one or more network entities associated with the cells of a cell group may be configured to determine a set of cell-specific SIB resource blocks over which an SIB may be transmitted during a subframe to minimize the probability of SIB read failure at one or more receiving UEs. In some examples, the cell-specific SIB resource blocks for a given cell of the cell group may be initially determined based on one or more Channel Quality Indicator (CQI) reports corresponding to one or more sub-bands (or resource blocks) that may be received from one or more UEs. For instance, based on the CQI reports, a network entity associated with each cell of a cell group may calculate different sub-band interference levels, and from these sub-band interference levels, may determine a set of optimal RBs for SIB transmission during one or more subframes. As each cell may independently determine its optimal RBs for SIB transmission, it follows that more than one cell in a cell group may have one or more of the same optimal RBs for SIB transmission in their respective sets. Therefore, to avoid multiple contemporaneous SIB transmissions in the cell group during the subframe, the network entities of the present disclosure may be configured to perform a conflict resolution procedure with a network entity of at least one other cell of the cell group when the cells share at least one optimal RB for SIB transmission. As a result of this conflict resolution procedure, each of the cells may finalize its set of cell-specific SIB transmission resource blocks and may transmit a SIB using those RBs during the subframe, thus minimizing the occurrence of inter-cell SIB transmission collision and the resulting interference. Furthermore, the set of cell-specific SIB transmission resource blocks may be periodically updated to account for changing channel conditions, wherein the period for this updating can be predefined.

Therefore, according to an example of aspects of the present disclosure, by intelligently grouping a set of cells into a plurality of groups based on one or more interference parameters measured at one or more network entities, halting one or more non-SIB RB transmissions in a subframe, and selecting a set of cell-specific optimal SIB radio bearers, the set of cells and their controlling network entities can minimize interference between cells. Accordingly, these aspects can improve the likelihood of successful SIB communication and can minimize the frequency of SIB read failures at one or more UEs, which can correspondingly minimize the occurrence of a UE camping on a non-4G access point, for instance, based on SIB read failures.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, functions, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media.

Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Referring first to FIG. 1, a diagram illustrates an example of a wireless communications system 100, in accordance with an aspect of the present disclosure. The wireless communications system 100 includes a plurality of access points (e.g., base stations, eNBs, or WLAN access points) 105, a number of user equipment (UEs) 115, and a core network 130. Access points 105 may include a SIB management component 602 configured to intelligently allocate different SIB RBs within dynamically granted and populated cell groups to minimize the occurrence of SIB read error in the UEs utilizing the access points 105. Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communications link 125 may be a multi-carrier signal modulated according to the various radio technologies described above. Each modulated signal may be sent on a different carrier and may carry control information (e.g., reference signals, control channels, etc.), overhead information, data, etc.

In some examples, at least a portion of the wireless communications system 100 may be configured to operate on multiple hierarchical layers in which one or more of the UEs 115 and one or more of the access points 105 may be configured to support transmissions on a hierarchical layer that has a reduced latency with respect to another hierarchical layer. In some examples a hybrid UE 115-a may communicate with access point 105-a on both a first hierarchical layer that supports first layer transmissions with a first subframe type and a second hierarchical layer that supports second layer transmissions with a second subframe type. For example, access point 105-a may transmit subframes of the second subframe type that are time division duplexed with subframes of the first subframe type that may be either time division duplexed or frequency division duplexed.

In some examples, hybrid UE 115-a may acknowledge receipt of a transmission by providing ACK/NACK for the transmission through, for example, a HARQ scheme. Acknowledgments from hybrid UE 115-a for transmissions in the first hierarchical layer may be provided, in some examples, after a predefined number of subframes following the subframe in which the transmission was received. The hybrid UE 115-a, when operating in the second hierarchical layer may, in examples, acknowledge receipt in a same subframe as the subframe in which the transmission was received. The time required to transmit an ACK/NACK and receive a retransmission may be referred to as round trip time (RTT), and thus subframes of the second subframe type may have a second RTT that is shorter than a RTT for subframes of the first subframe type.

In other examples, a second layer UE 115-b may communicate with access point 105-b on the second hierarchical layer only. Thus, hybrid UE 115-a and second layer UE 115-b may belong to a second class of UEs 115 that may communicate on the second hierarchical layer, while legacy UEs 115 may belong to a first class of UEs 115 that may communicate on the first hierarchical layer only. Access point 105-b and UE 115-b may communicate on the second hierarchical layer through transmissions of subframes of the second subframe type. Access point 105-b may transmit subframes of the second subframe type exclusively, or may transmit one or more subframes of the first subframe type on the first hierarchical layer that are time division multiplexed with subframes of the second subframe type. Second layer UE 115-b, in the event that access point 105-b transmits subframes of the first subframe type, may ignore such subframes of the first subframe type. Thus, second layer UE 115-b may acknowledge receipt of transmissions in a same subframe as the subframe in which the transmissions are received. Thus, second layer UE 115-b may operate with reduced latency compared to UEs 115 that operate on the first hierarchical layer.

The access points 105 may wirelessly communicate with the UEs 115 via one or more access point antennas. Each of the access points 105 may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies. The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In LTE/LTE-A network communication systems, the terms evolved Node B (eNodeB or eNB) may be generally used to describe the access points 105. The wireless communications system 100 may be a Heterogeneous LTE/LTE-A/ULL LTE network in which different types of access points provide communication coverage for various geographical regions. For example, each access point 105 may generate a macro cell, a pico cell, a femto cell, and/or other types of cells. Small cells such as pico cells, femto cells, and/or other types of cells may include low power nodes or LPNs. A macro cell generally covers a relatively large geographic area (e.g., several kilometers in radius) and may allow unrestricted access by UEs 115 with service subscriptions with the network provider. A small cell would generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may generate and support one or multiple (e.g., two, three, four, and the like) cells.

The core network 130 may communicate with the eNBs or other access points 105 via a backhaul 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). For instance, measured interference parameter values may be exchanged among access points 105 via the backhaul links 134. The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communications links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communications links 125 may carry transmissions of each hierarchical layer which, in some examples, may be multiplexed in the communications links 125. The UEs 115 may be configured to collaboratively communicate with multiple access points 105 through, for example, Multiple Input Multiple Output (MIMO), carrier aggregation (CA), Coordinated Multi-Point (CoMP), or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

As mentioned, in some examples access points 105 and UEs 115 may utilize carrier aggregation to transmit on multiple carriers. In some examples, access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. Hybrid UE 115-a, and/or second layer UE 115-b may, in certain examples, receive and/or transmit one or more subframes in a second hierarchical layer utilizing a single carrier that has a bandwidth greater than a bandwidth of one or more of the separate carriers. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communications system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communications links 125 for LTE downlink transmissions for each hierarchical layer, while single carrier frequency division multiple access (SC-FDMA) communications signals may be used in the communications links 125 for LTE uplink transmissions in each hierarchical layer. Additional details regarding implementation of hierarchical layers in a system such as the wireless communications system 100, as well as other features and functions related to communications in such systems, are provided below with reference to the following figures.

Figure 2:
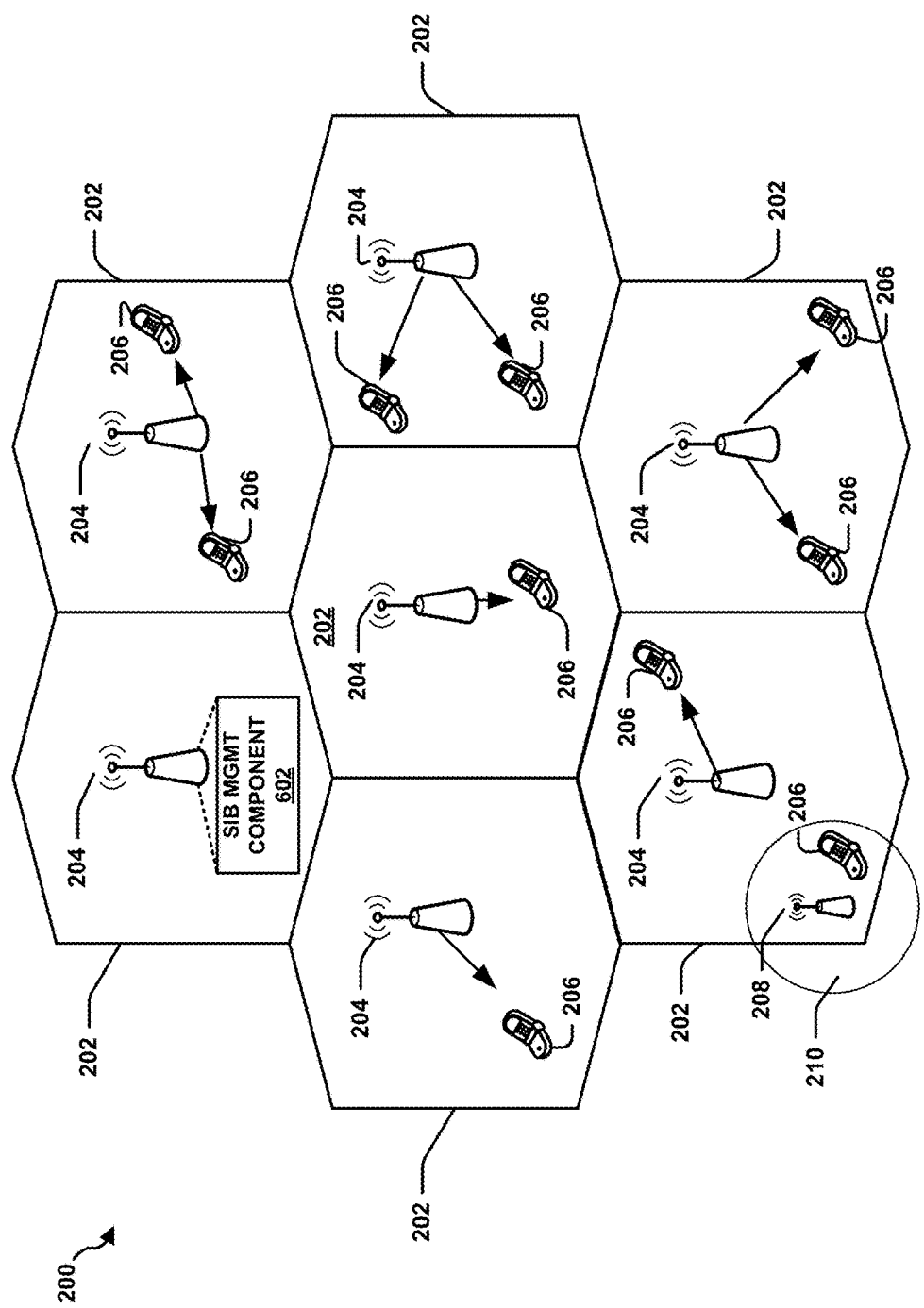
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the evolved packet core for all the UEs 206 in the cells 202. In an aspect, eNBs 204 may include a SIB management component 602 configured to intelligently allocate different SIB RBs within dynamically granted and populated cell groups to minimize the occurrence of SIB read error in the UEs utilizing the access points 105 There is no centralized controller in this example of an access network 200, but a centralized controller may be used in alternative configurations, for instance, to perform cell group creation and population operations (which is described herein primarily in reference to a network entity, though a centralized controller may alternatively perform these operations). The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. Spatial multiplexing (often abbreviated SM or SMX) is a transmission technique in MIMO wireless communication to transmit independent and separately encoded data signals, so-called streams, from each of the multiple transmit antennas. When channel conditions are less favorable, beamforming may be used to focus the transmission energy in one or more directions. Beamforming is companion to 4×4 MIMO technology for Wi-Fi wireless networking. When it is included, it enables dramatic improvement in Wi-Fi 802.11ac/n performance, reliability, range and coverage. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
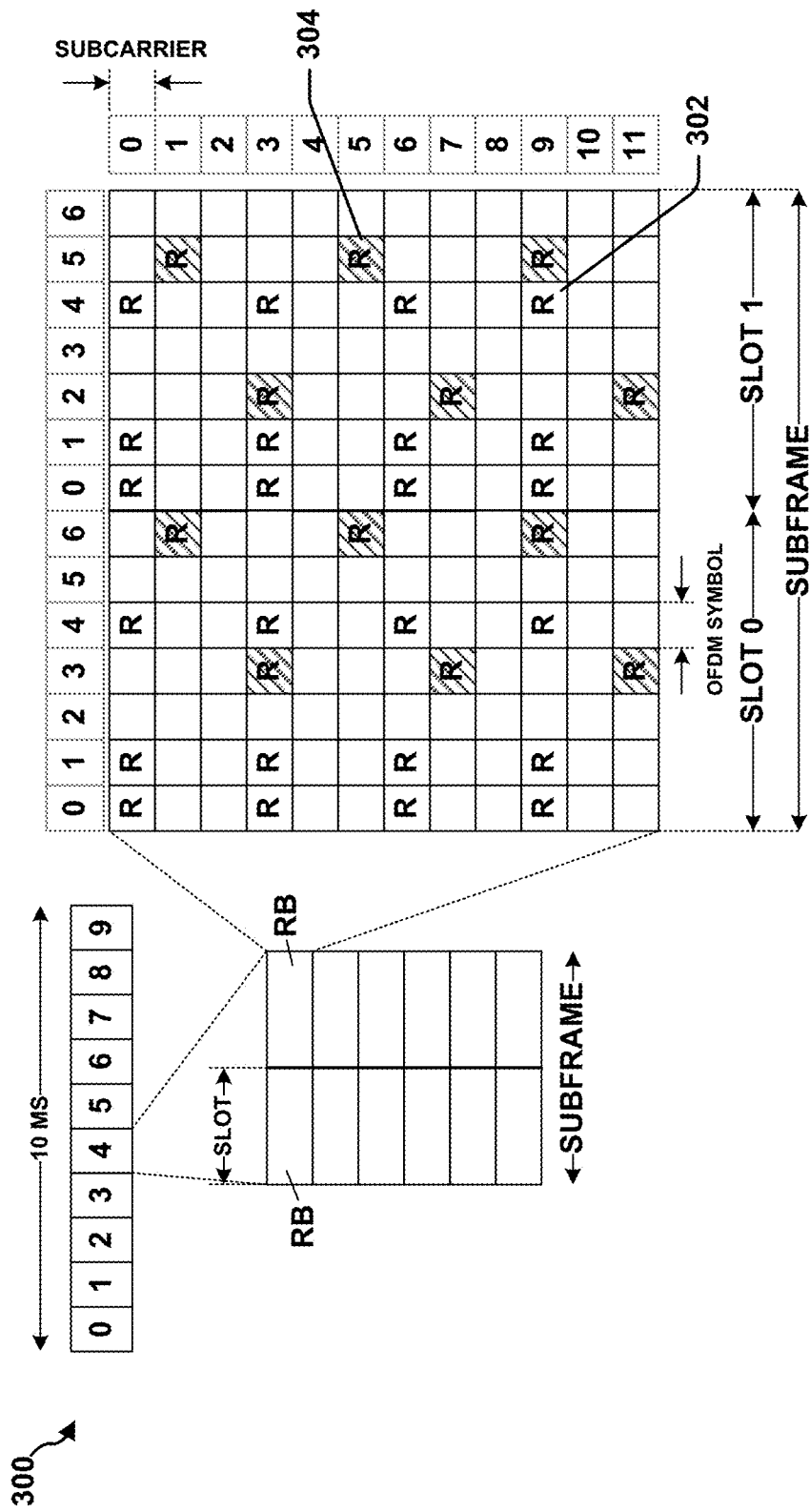
FIG. 3 is a diagram illustrating an example of a DL frame structure in LTE.

FIG. 3 is a diagram 300 illustrating an example of a DL frame structure in LTE, which, in some examples, may be utilized in conjunction with transmitting one or more SIBs or conducting one or more non-SIB RB transmissions (e.g., PDSCH transmission) provided by the present disclosure. A frame (10 ms) may be divided into 10 equally sized sub-frames. Each sub-frame may include two consecutive time slots. A resource grid may be used to represent two time slots, each time slot including a resource element block. The resource grid is divided into multiple resource elements. In LTE, a resource element block may contain 12 consecutive subcarriers in the frequency domain and, for a normal cyclic prefix in each OFDM symbol, 7 consecutive OFDM symbols in the time domain, or 84 resource elements. For an extended cyclic prefix, a resource element block may contain 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource element blocks upon which the corresponding PDSCH is mapped. The number of bits carried by each resource element depends on the modulation scheme. Thus, the more resource element blocks that a UE receives and the higher the modulation scheme, the higher the data rate for the UE.

Figure 4:
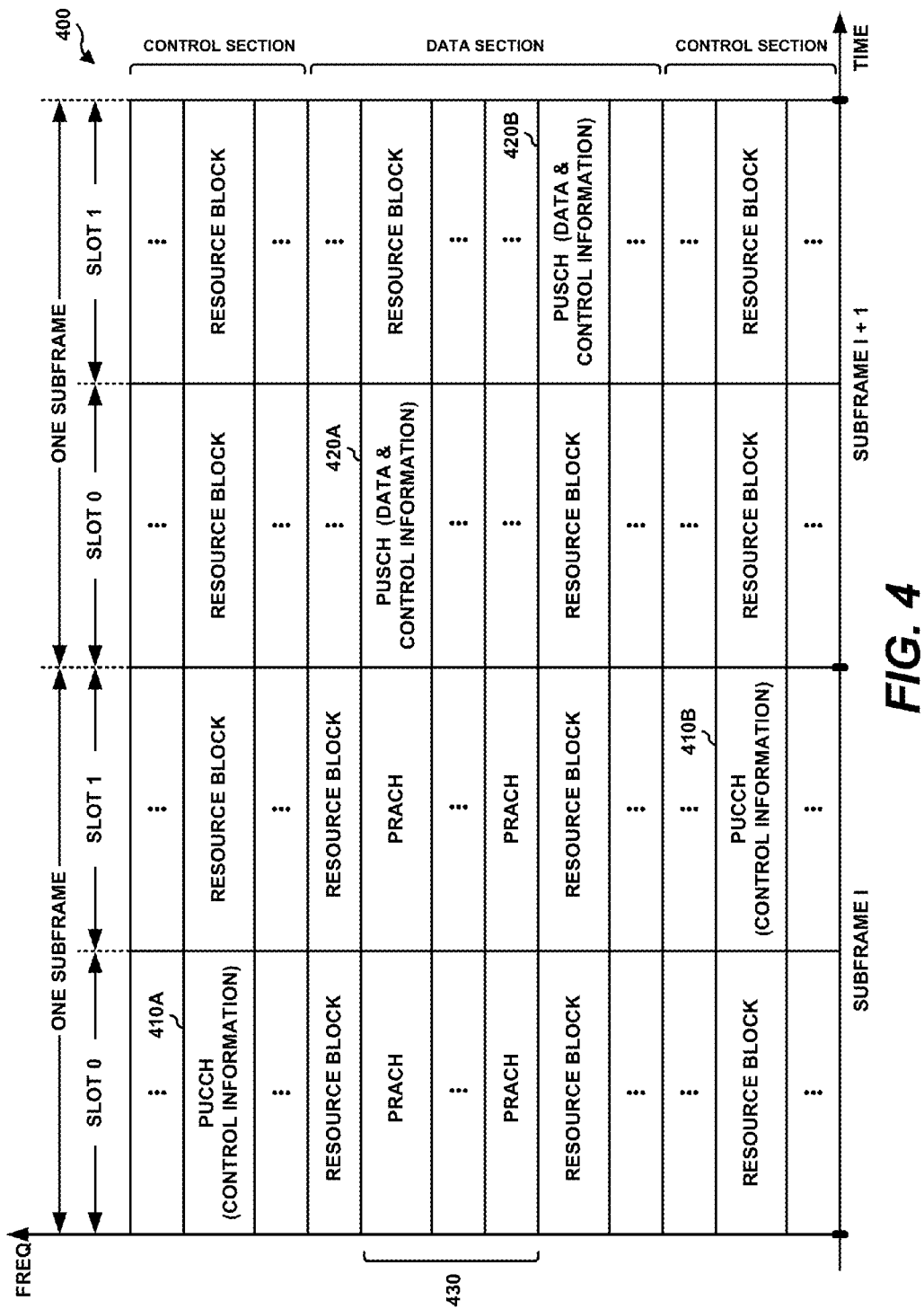
FIG. 4 is a diagram illustrating an example of an UL frame structure in LTE.

FIG. 4 is a diagram 400 illustrating an example of an UL frame structure in LTE, which may be utilized by one or more UEs for transmission of, for example, one or more sub-band-specific CQIs to a network entity. The available resource element blocks for the UL may be partitioned into a data section and a control section. The control section may be formed at the two edges of the system bandwidth and may have a configurable size. The resource element blocks in the control section may be assigned to UEs for transmission of control information. The data section may include all resource element blocks not included in the control section. The UL frame structure results in the data section including contiguous subcarriers, which may allow a single UE to be assigned all of the contiguous subcarriers in the data section.

A UE may be assigned resource element blocks 410a, 410b in the control section to transmit control information to an eNB. The UE may also be assigned resource element blocks 420a, 420b in the data section to transmit data to the eNB. The UE may transmit control information in a physical UL control channel (PUCCH) on the assigned resource element blocks in the control section. The UE may transmit only data or both data and control information in a physical UL shared channel (PUSCH) on the assigned resource element blocks in the data section. A UL transmission may span both slots of a subframe and may hop across frequency.

A set of resource element blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource element blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
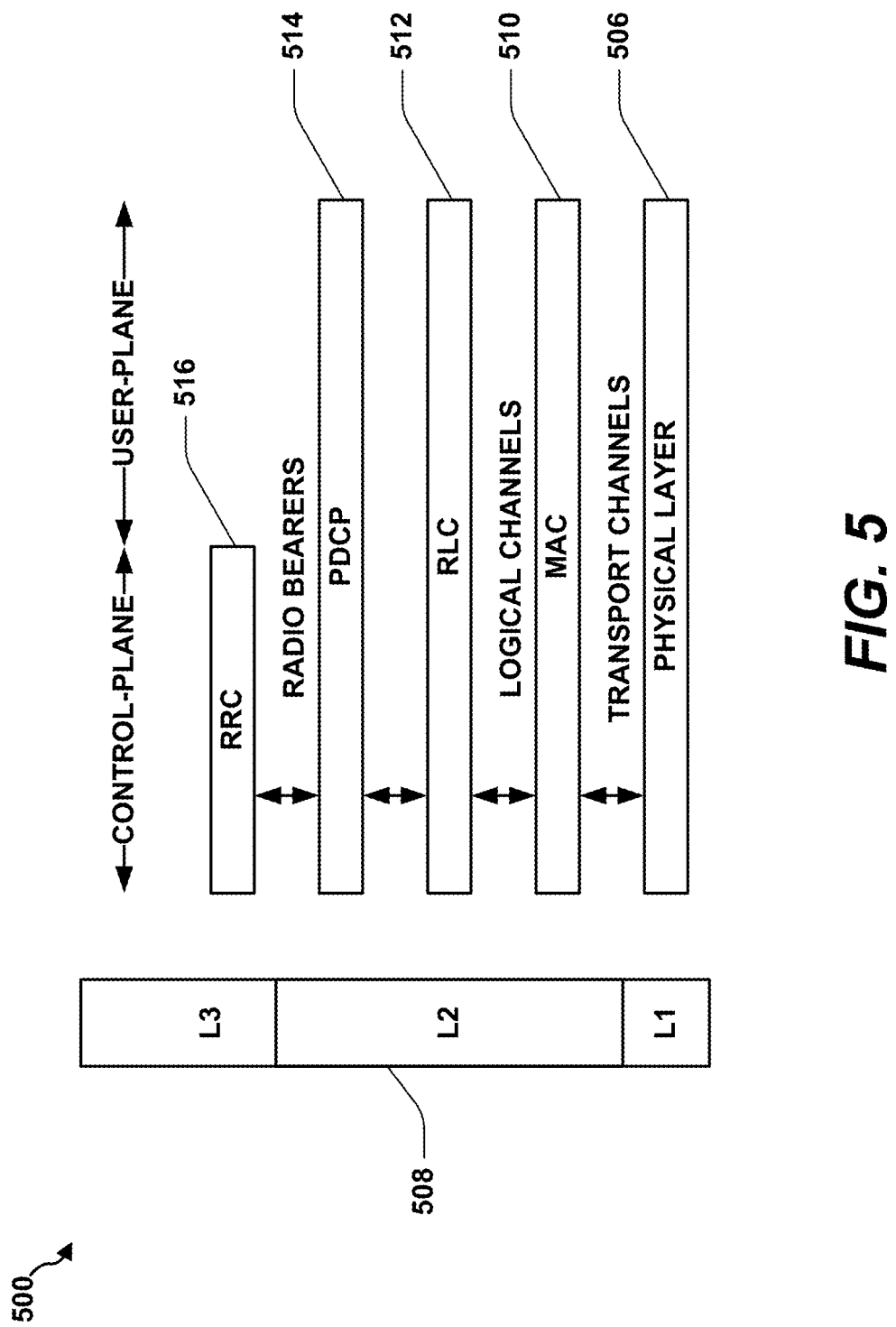
FIG. 5 is a diagram illustrating an example of a radio protocol architecture for the user and control planes.

FIG. 5 is a diagram 500 illustrating an example of a radio protocol architecture for the user and control planes in LTE, which may, in a non-limiting aspect of the disclosure, be utilized for communication between network entities associated with cells in a cell group, between the network entities and a central controller of the set of cells, and/or for communication between the network entities and one or more UEs. The radio protocol architecture for the UE and the eNB (network entity) is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource element blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
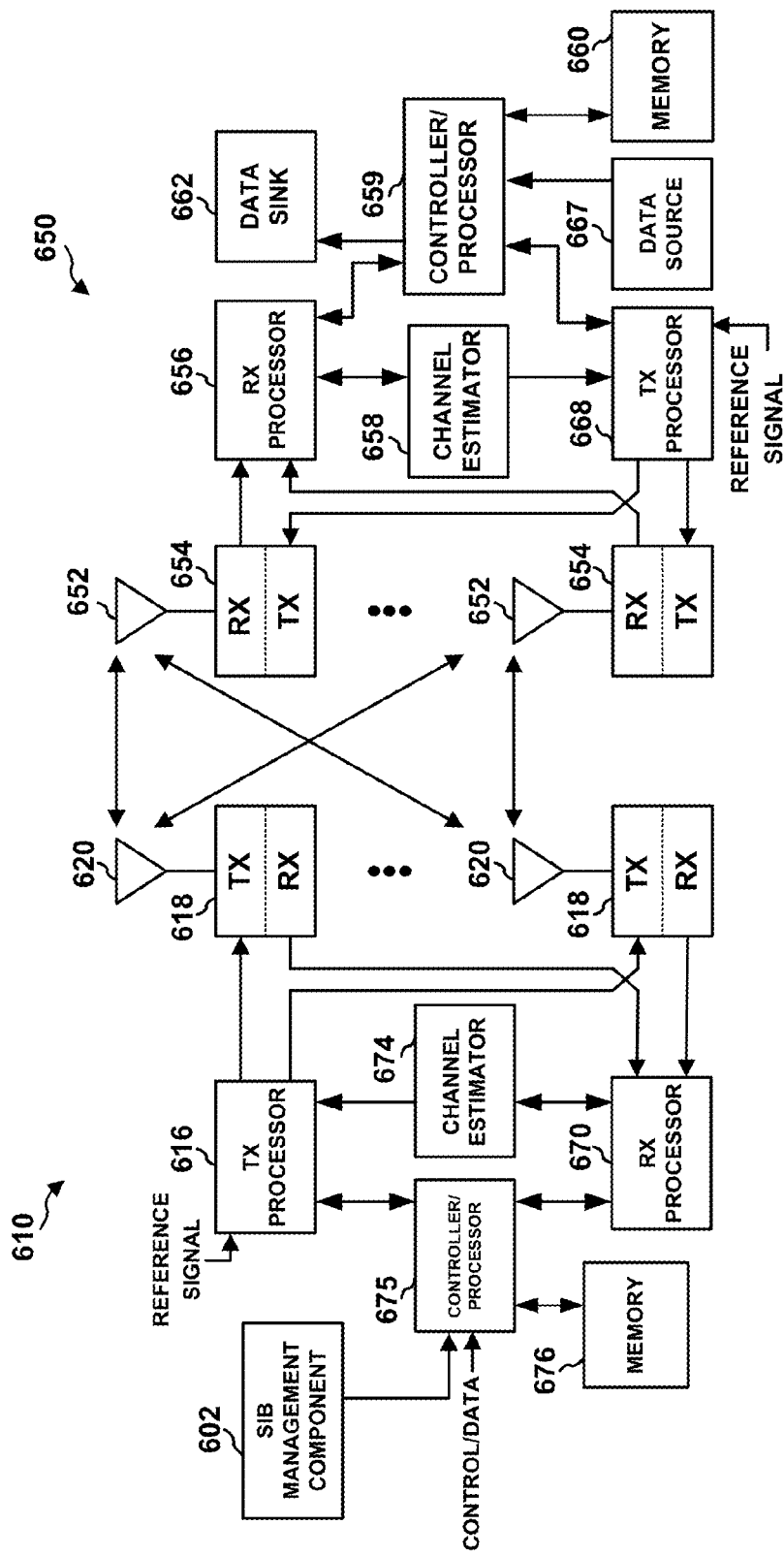
FIG. 6 is a diagram illustrating an example of an evolved Node B and user equipment in an access network.

FIG. 6 is a block diagram of an eNB 610 (which may correspond to the network entity controlling a cell of the set of cells/a cell group of the present disclosure) in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission. In addition, eNB 610 may include an SIB management component 602 configured to intelligently allocate different SIB RBs within dynamically granted and populated cell groups to minimize the occurrence of SIB read error in the UEs 650 utilizing the eNB 610.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network.

The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

FIG. 7 is a diagram illustrating an example grouping of a set of cells 700 into a plurality of cell groups based on at least one interference parameter associated with each cell, according to aspects of the present disclosure. In the non-limiting example cell grouping shown in FIG. 7, as illustrated by the separate shading/patterns of the individual cells 702 of the set of cells 700 and as visually explained in the key, the set of cells 700 may be grouped into three cell groups: first cell group 706, second cell group 708, and third cell group 710. As illustrated, each of the cell groups may include at least one cell 702 of the set of cells 700 and at least one network entity 704 generating and controlling the at least one cell 702. In addition, as illustrated by cell 702A and the other cells 702 of the first cell group 706, though the cells of a cell group may be contiguous, the cells may also by discontiguous (i.e. all cells of the cell group may not necessarily share at least one cell edge or be considered a neighbor cell to another cell of its cell group). Furthermore, although the reference numerals for cell 702 and its associated network entity (e.g., eNB) 704 are only explicitly shown with respect to one cell and one network entity of FIG. 7, it should be understood that each of the cells in the set of cells 700 is a cell 702 having an associated network entity 704.

In an aspect of the present disclosure, each of the network entities 704 may be configured to determine a cell group with which its cell 702 is associated based on at least one interference parameter with the respective cell 702. In some examples, this may include obtaining the cell group information from a centralized controller/controlling device, which may be communicatively coupled to each of the network entities 704 of FIG. 7 (though not shown here). In other examples, however, network entity 704 may determine the cell group of its corresponding cell 702 by executing a coordinated cell grouping algorithm in conjunction with one or more other network entities 704 corresponding to one or more other cells 702 of the set of cells 700. The coordinated cell grouping algorithm, when executed/performed by one or more of the network entities 704 in coordination or by a centralized controller, may be configured to create and populate the plurality of cell groups based on at least one interference parameter associated with the set of cells 700, and particularly, associated with the individual cells 702 of the set of cells 700. As such, each network entity 704 may determine the cell group of its associated cell 702 based on execution of the coordinated cell grouping algorithm.

In an aspect, the at least one interference parameter may include interference parameters measured or otherwise obtained by a network entity 704 and communicated to at least one other network entity 704 of the set of cells 700 or a particular cell group or groups. In addition, the at least one interference parameter may be one or more of several types of measurable interference parameters, such as but not limited to a signal to noise ratio (SNR), a reference signal received power (RSCP), etc. These interference parameters may be computed by each network entity 704 to determine interference values associated with the other cells 702 of the set of cells 700 and which may be transmitted to the other network entities 704 associated with the set of cells 700 over an X2 connection. For example, in an aspect, one or more network entities 704 may share interference values associated with each respective network entity 704 to one or more other network entities.

In addition, the at least one interference value may include other types of values that, although not interference values per se, may be indicative of a degree of interference between the cell 702 and another cell 702 of the set of cells 700. For instance, the network entity 704 may be configured to determine, as an interference value, a degree of wireless coverage overlap between the cell of the network entity 704 and one or more of its neighboring cells. Alternatively or additionally, for each cell, the corresponding network entity 704 may determine a strongest interfering cell out of the cells in the set of cells 700. In an aspect, this determination may be based on measuring, at a network entity 704, one or more cell-specific interference levels corresponding to the one or more other cells of the set of cells. For example, one or more of the network entities 704, e.g., neighboring or contiguous cells, may coordinate signaling (e.g., only one cell transmits at a time) to enable each respective network entity 704 to identify a strongest interfering one of the neighboring or contiguous cells. The identity of the strongest interfering cell associated with each cell may be shared among the network entities 704 over a plurality of X2 connections as a part of executing the coordinated cell grouping algorithm. In addition, the strongest interfering cell (or an interference parameter itself) may be determined according to a proximity of a cell 702 to one or more neighboring cells based on a delay associated with communications between network entities on an X2 interface, with the closer the proximity of the cells tending to show an increased likelihood of interference. In addition, the strongest interfering cell (or an interference parameter itself) may be determined based on a handover count from one cell to another cell, wherein a high handover count tends to indicate a strong coverage overlap between cells 702, and therefore, increased interference.

Furthermore, once the one or more interference parameters associated with the set of cells 700 have been determined and shared with each of the other cells of the set of cells 700, some or all of the network entities 704 may execute the coordinated cell grouping algorithm, and as a result, may create and populate the plurality of cell groups (e.g., which may include a first cell group 706, a second cell group 708, and/or a third cell group 710) based on the at least one interference parameter. For example, in an aspect, one or more cells may be interfering with one another, and as such, the cells are grouped together. Once the cells are grouped together, one or more SIB RBs within the group are allocated to avoid SIB to SIB interference. The PDSCH data RBs may then be blanked within the group of cells for SIB subframes to avoid further SIB-PDSCH interference. The grouping of the cells may be determined based on collected cell-to-cell interference parameters. This determination may be performed at either a centralized self-organizing network (SON) or a distributed SON. As shown in FIG. 7, the number of cells in a cell group may vary across groups and is dependent upon, for example, values of the one or more interference parameters, such as measured interference or coverage overlap. For instance, in FIG. 7, the first cell group 706 contains five cells, the second cell group 708 contains six cells, and the third cell group 710 contains seven cells. Furthermore, the number of cells in the cell groups may have a maximum allowable value in order to manage the increasing complexities inherent to increasing cell group sizes. Moreover, such cell grouping can be dynamically updated periodically by each group member, the cell group as a whole, or by the centralized entity to address changes to interference.

Thus, once different groups of cells having the highest cell-to-cell interference are identified, then the present aspects operate to configure RBs within each cell group and/or between cell groups so as to avoid or reduce "non-SIB" (e.g., other signaling that is not SIB signaling, such as but not limited to PDSCH data)-to-SIB interference, and/or, to avoid or reduce SIB-to-SIB interference, as described in more detail below. In an aspect, the non-SIB portion may correspond to either RRC signaling or user data both of which correspond to PDSCH data.

Additionally, the present aspects may include solutions for cell-specific RB allocations for SIB transmissions and non-SIB RB transmission halting within a SIB subframe of a respective cell group based on determining each cell group, as described below.

Figure 8B:
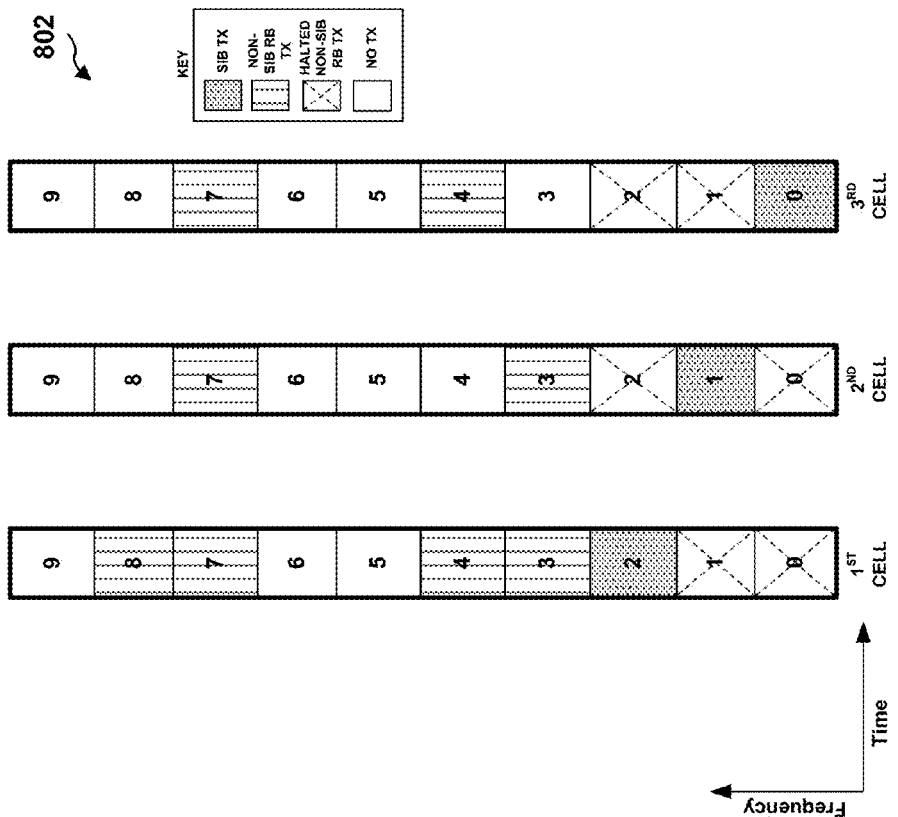
FIGS. 8A and 8B are diagrams illustrating example cell-specific RB allocations for SIB transmissions and non-SIB RB transmission halting according to the present disclosure.
Figure 8A:
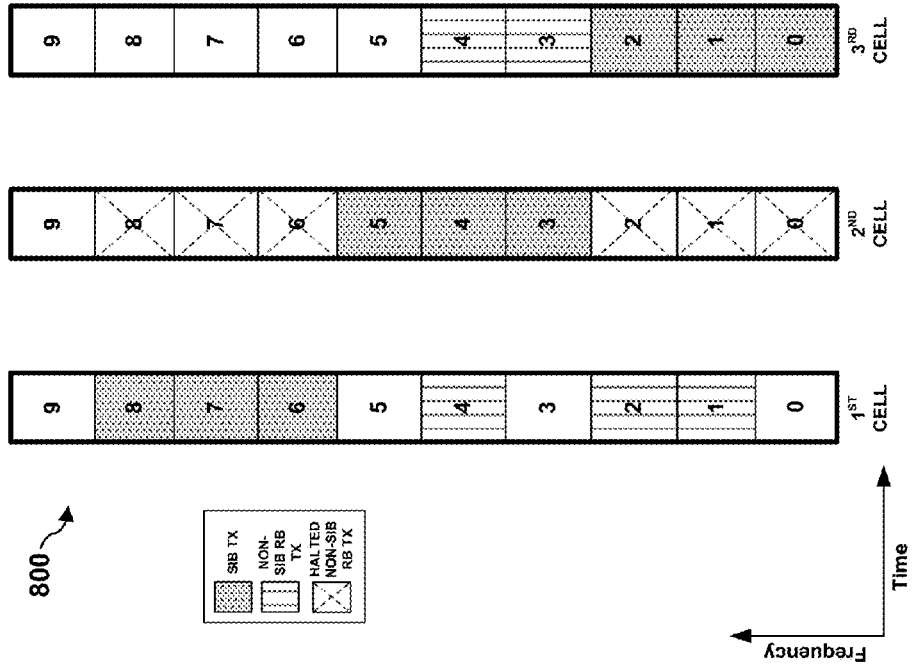

FIGS. 8A and 8B are diagrams illustrating example cell-specific RB allocations for SIB transmissions and non-SIB RB transmission halting within a SIB subframe of a respective cell group according to the present disclosure. In an aspect of the present disclosure, a network entity associated with each cell of a cell group may be configured to determine whether to halt one or more non-SIB RB transmissions during a subframe so as to avoid potential interference with an SIB transmission of another cell in its cell group. This "halting" of one or more scheduled non-SIB RB transmissions may include blocking or canceling the scheduled non-SIB RB transmissions, pausing the non-SIB RB transmissions until another subframe where such interference is less likely to occur, re-queuing the non-SIB RB transmission, or the like. Furthermore, the halting decision process described herein may be limited to the cells of a cell group and no other cells.

In an aspect, the decision whether to halt a non-SIB RB transmission in a particular subframe may be based on a number of SIB resource blocks over which any SIB transmission is scheduled for any cell of a cell group during the subframe. As such, a network entity of a cell may be configured to obtain the number of SIB resource blocks over which a SIB transmission is scheduled during the subframe for the cell group, for instance, by receiving an indication (e.g., over the X2 interface) of a number of SIB resource blocks over which an SIB transmission is scheduled for each other network entity of the group. In addition, the number of SIB resource blocks (y) may be obtained by multiplying a number of SIBs to be transmitted in the cell group in the subframe (z) with the number of RBs per SIB (w), or in other words, finding the value of y in the equation $y=z*w$.

Furthermore, the network entity may obtain a threshold value (e.g., a SIB threshold value) against which the number of SIB RBs in the cell group for the subframe is compared to determine a number (or percentage) of scheduled non-SIB RB transmissions (e.g. PDSCH RB transmission) to halt during the subframe. This threshold value may be preconfigured, static within a group, or dynamic based on a number of cells in a cell group or other factors.

In an aspect, if the network entity determines, based on the comparison, that the total number of SIB RBs in the subframe (y above) is greater than the threshold value (indicating a relatively high number of SIB transmissions for the subframe), the network entity may halt any scheduled non-SIB RB transmissions for its cell that collides with a SIB RB during the subframe if the cell of the network entity is a top "x" interferer in the cell group (where x is a configurable value dependent, for instance, on a number of cells in the cell group). For instance, where the number of SIB RBs in the subframe is greater than the threshold value, and where the value of x is two, the greatest interference generating cell and the second greatest interference generating cell of the cell group (e.g., as determined by the other cells of the cell group) may halt any scheduled non-SIB RB transmissions for the respective cell that collide with SIB RBs of other cells in the cell group in the subframe.

An example similar to the above scenario is shown in FIG. 8A. As indicated in the diagram 800, a first cell, second cell, and third cell of a cell group each contain three SIB RBs that are scheduled for transmission during the subframe (first cell: RBs 6, 7 and 8; second cell: RBs 5, 4, and 3; third cell: RBs 2, 1, and 0), making the total number of SIB RBs in the subframe equal to nine. In this example, the threshold value is set to six, and as such, the number of SIB RBs for the subframe is greater than the threshold. In addition, the value of x for the cell group is one in the example of FIG. 8A, and in this example the second cell is identified as the top "x" interferer. As a result, according to the present aspects, the previously scheduled non-SIB RB transmissions at RBs 0, 1, 2, 6, 7, and 8 of the second cell are halted by the network entity because each of these RBs would collide with either the SIB RBs 6, 7, and 8 of the first cell or the SIB RBs 0, 1, and 2 of the third cell.

On the other hand, in another aspect, if the network entity determines, based on the comparison, that the total number of SIB RBs in the subframe (y above) is less than the threshold value, then each network entity in the cell group may halt scheduled non-SIB RB transmissions for its respective cell that would collide with an SIB RB of other cells of the cell group during the subframe.

An example of this scenario is shown in FIG. 8B. As indicated in the diagram 802, a first cell, second cell, and third cell of a cell group each contain a single SIB RB that is scheduled for transmission during the subframe (first cell: RB 2; second cell: RB 1; third cell: RB 0), making the total number of SIB RBs in the subframe equal to three. In this example, the threshold value is again set to six, and as such, the number of SIB RBs for the subframe is less than the threshold. Thus, according to the present aspects, the previously scheduled non-SIB RB transmissions at RBs 0 and 1 of the first cell, RBs 0 and 2 of the second cell, and RBs 1 and 2 of the third cell are halted by the respective network entities associated with each of the first, second, and third cells.

Thus, according to the present aspects, each network entity within a cell group may stop or halt non-SIB RBs transmissions in order to avoid such transmissions from interfering with SIB RB transmissions of other cells within the cell group.

Additionally, the present aspects may include solutions for positioning SIB RBs for one or more cells within a cell group to reduce interference between SIB transmissions and other signaling between the cells in the cell group, as described below.

Figure 9:
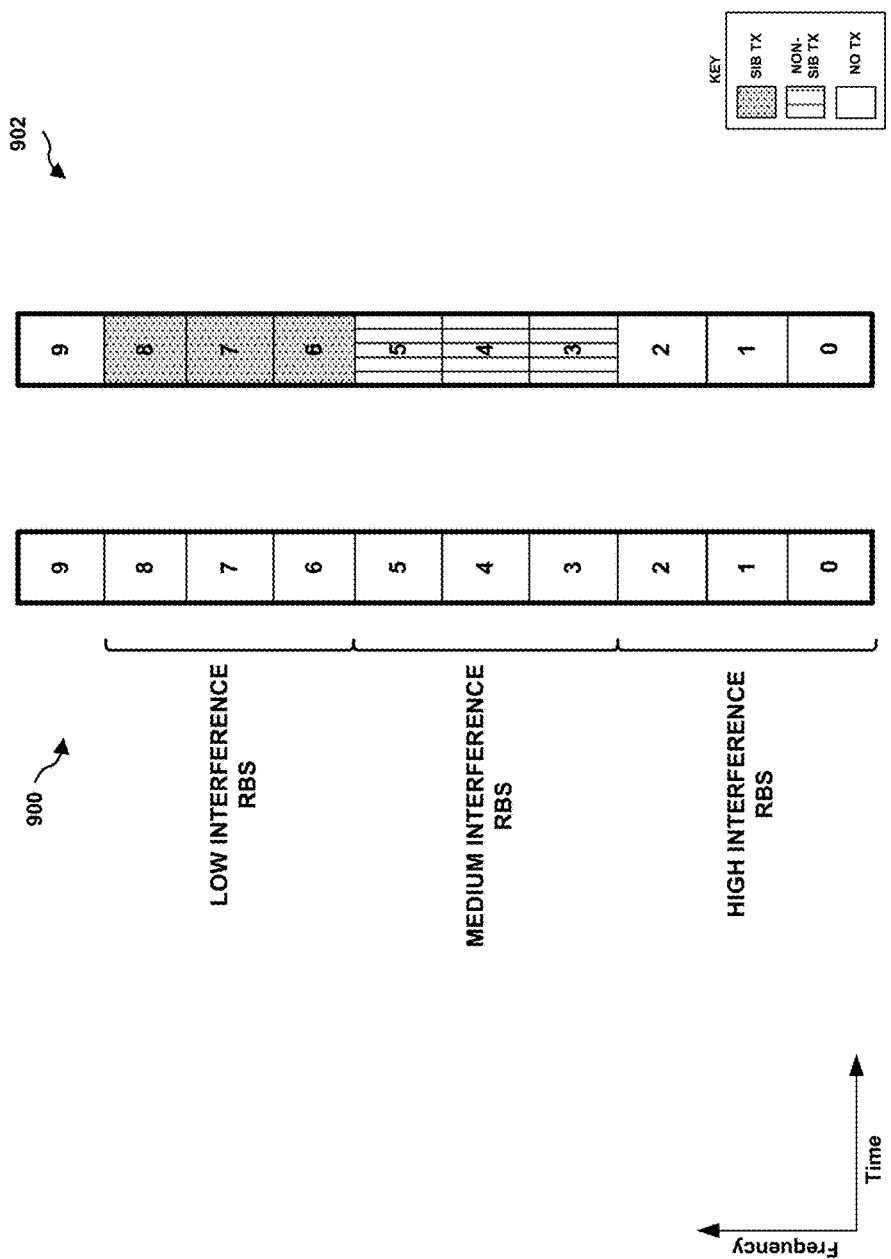
FIG. 9 is a diagram illustrating an example SIB RB selection process for a cell according to the present disclosure.

FIG. 9 is a diagram illustrating an example SIB RB selection process for a cell according to the present disclosure. In an aspect of the disclosure, a network entity may be configured to determine SIB transmission resource blocks that are tailored to the cell based on reported channel quality and/or interference information associated with one or more RBs for a subframe. Thus, the network entity controlling a cell may obtain a set of cell-specific SIB transmission resource blocks for the cell, and may transmit an SIB over at least one resource block of the set of cell-specific SIB transmission resource blocks during the subframe.

In order to obtain the set of cell-specific SIB transmission RBs, the network entity may first calculate different frequency sub-band (or RB) interference levels based on sub-band channel quality indicator (CQI) reports received from one or more UEs in communication with the network entity. Based on these sub-band interference levels, the network entity may determine a set of optimal SIB transmission resource blocks based on the sub-band interference levels. This aspect is illustrated by RB diagram 900 in FIG. 9, where the network entity has determined based on sub-band CQI reports that RBs 6-8 are low interference RBs, and are therefore optimal in relation to the high and medium interference RBs 0-5. After determining that the set of optimal SIB transmission RBs for the cell are RBs 6-8, the network entity may determine whether any of the set of optimal SIB transmission RBs is an optimal SIB transmission resource block of another cell of the cell group. If so, the network entity may perform a conflict resolution procedure with a network entity of at least one other cell of the cell group in order to finalize the set of cell-specific SIB transmission resource blocks. In the example presented in right RB diagram 902 of FIG. 9, performing the conflict resolution procedure with any other network entities resulted in the cell illustrated in FIG. 9 finalizing its set of optimal SIB transmission RBs as RBs 6-8, which optimally correspond to the low interference RBs. Furthermore, the set of cell-specific SIB transmission resource blocks may be periodically updated to account for changing channel conditions, wherein the period for this updating can be predefined.

In a further aspect of the disclosure, placement of SIB transmission RBs in a subframe may be coordinated among cells of the cell group, but may, in some instances, be fixed for the cells in a cell group (or across all cell groups of the set of cells), for example, based on a number of cells in the cell group (or set of cells). For example, in an aspect, the placement of SIB transmission RBs in the subframe may be fixed within each cell group. In an instance, the SIBs for each top interferes within each cell group may be staggered. The SIB placement may be determined without any QCI and/or subband feedback, and the SIB placement may be based on entirely on the cell group size. Each cell group may determine the fixed SIB location independently or via centralized SON control. In another aspect, placement of SIB transmission RBs in the subframe may be fixed for the entire wireless network (e.g., SON system). The SIBs for the top interferes within each cell group may be staggered. In this aspect, the SIB placement may be determined without any CQI and/or subband feedback, and the SIB placement may be based on the cell group size.

Figure 10:
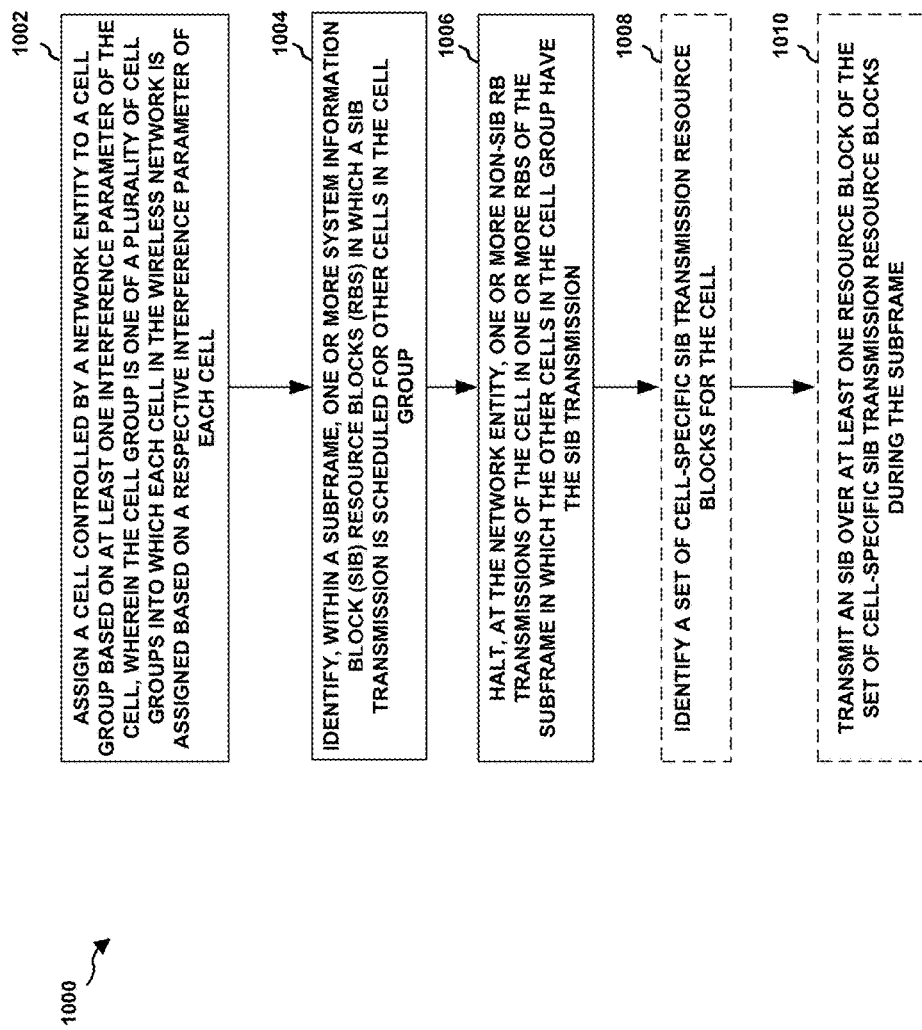
FIG. 10 is a flow chart of a method of SIB management during wireless communication.
Figure 12:
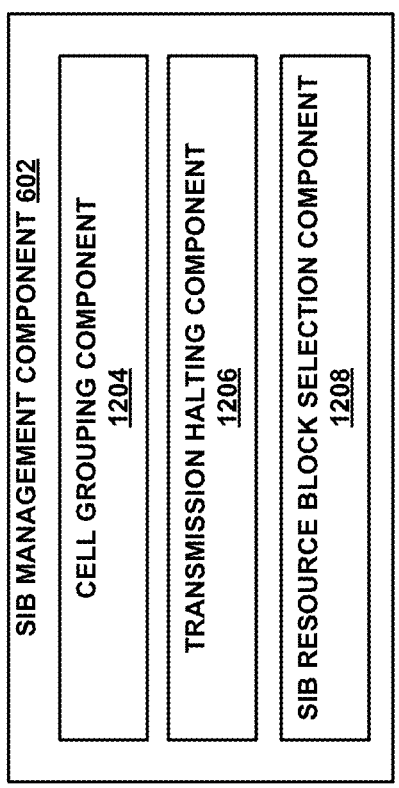
FIG. 12 is a diagram illustrating an SIB management component configured to implement aspects of the present disclosure.

Referring to FIGS. 10 and 12, a network entity (e.g., an eNB, eNodeB, coordinated controller device) or a component of the network entity, such as, but not limited to, SIB management component 602 of FIGS. 1, 2, 6 and 12 may perform an aspect of a method 1000 for managing SIB using SIB resource blocks allocation, and PDSCH data resource block blanking. FIG. 12 is a block diagram containing a plurality of sub-components of a SIB management component 602 (see FIG. 6), which may be implemented by a network entity (e.g., an eNB, eNodeB, or any other wireless network access point) for managing SIB transmissions in a cell of a cell group. SIB management component 602 may include a cell grouping component 1204, which may be configured to perform any aspect of the present disclosure related to grouping one or more cells of a set of cells into a plurality of cell groups, for instance, based on at least one interference parameter. While, for purposes of simplicity of explanation, the method is shown and described as a series of acts, it is to be understood and appreciated that the method is not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

For example, in an aspect, at block 1002, method 1000 may include assigning a cell controlled by a network entity to a cell group based on at least one interference parameter of the cell, wherein the cell group is one of a plurality of cell groups into which each cell in the wireless network is assigned based on a respective interference parameter of each cell. In an aspect, block 1002 may be performed by cell grouping component 1204 of FIG. 12. In an aspect, for example, cell grouping component 1204 may execute cell grouping component 1204 to assign a cell (e.g., cell 702 of FIG. 7) controlled by a network entity to a cell group (e.g., first cell group 706) based on at least one interference parameter of the cell, wherein the cell group is one of a plurality of cell groups into which each cell in the wireless network is assigned based on a respective interference parameter of each cell.

In an aspect, cell grouping component 1204 and/or cell grouping component 1204 may execute, in conjunction with one or more other network entities corresponding to one or more other cells of the set of cells, a coordinated cell grouping algorithm configured to determine the plurality of cell groups based on at one or both of the at least one interference parameter and interference parameters of each cell of the plurality of cell groups. Cell grouping component 1204 and/or cell grouping component 1204 may perform the execution of the coordinated cell grouping algorithm by measuring one or more cell-specific interference level values corresponding to the one or more other cells of the set of cells, determine a strongest interfering cell based on the one or more interference level values, and report the strongest interfering cell to the one or more other cells of the set of cells. In some instances, cell grouping component 1204 and/or cell grouping component 1204 may group the cell based on the strongest interfering cell.

In an additional aspect, method 1000 may include, at block 1004, identifying, within a subframe, one or more SIB RBs in which a SIB transmission is scheduled for other cells in the cell group. In an aspect, block 1004 may be performed by transmission halting component 1206 if FIG. 12. In an aspect, for example, cell grouping component 1204 may execute transmission halting component 1206 to identify, within a subframe, one or more SIB RBs in which a SIB transmission is scheduled for other cells in the cell group. In an instance, cell grouping component 1204 and/or transmission halting component 1206 may determine that a number of SIB RBs is greater than a threshold number, and determine that a set of top interfering cells in the cell group includes the cell based on one or more interference parameters corresponding to each cell in the cell group. In some instances, the number of SIB RBs corresponding to one or more SIB RBs over which a SIB transmission is scheduled during the subframe for the cell group. In another instance, cell grouping component 1204 and/or transmission halting component 1206 may determine that a number of SIB resource blocks is less than or equal to a threshold number, wherein the number of SIB RBs corresponding to one or more SIB RBs over which a SIB transmission is scheduled during the subframe for the cell group.

Additionally, method 1000 may include, at block 1006 halting, at the network entity, one or more non-SIB RB transmissions of the cell in the identified one or more SIB RBs in the subframe in which the SIB transmission is scheduled for the other cells in the cell group. In an aspect, block 1006 may be performed by transmission halting component 1206 of FIG. 12. In an aspect, for example, cell grouping component 1204 may execute transmission halting component 1206 to halt one or more non-SIB RB transmissions of the cell in the identified one or more SIB RBs in the subframe in which the SIB transmission is scheduled for the other cells in the cell group. In some instances, cell grouping component 1204 may execute transmission halting component 1206 to halt one or more scheduled non-SIB RB transmissions for the cell that collide with any SIB RBs of the one or more cells in the cell group in the subframe. In another instance, cell grouping component 1204 may execute transmission halting component 1206 to halt one or more scheduled non-SIB RB transmissions for the cell that collide with any SIB RBs of the one or more cells in the cell group in the subframe based on the determining.

In an additional optional aspect (as indicated by the dashed lines of block 1008), method 1000 may include identifying a set of cell-specific SIB transmission resource blocks for the cell, which may be performed by SIB resource block selection component 1208. In an aspect, for example, cell grouping component 1204 may execute SIB resource block selection component 1208 to identify a set of cell-specific SIB transmission resource blocks for the cell. In an instance, cell grouping component 1204 may execute SIB resource block selection component 1208 to calculate, based on a plurality of sub-band CQI reports, a plurality of sub-band interference levels corresponding to a plurality of corresponding sub-bands. Further, cell grouping component 1204 may execute SIB resource block selection component 1208 to determine a set of optimal SIB transmission resource blocks based on the sub-band interference levels, and perform a conflict resolution procedure with a network entity of at least one other cell of the cell group where at least one of the set of optimal SIB transmission resource blocks is an optimal SIB transmission resource block of another cell of the cell group to finalize the set of cell-specific SIB transmission resource blocks. In some instances, cell grouping component 1204 may execute SIB resource block selection component 1208 to re-obtain the set of cell-specific SIB transmission resource blocks for the cell according to a period to account for changing channel conditions.

In a further optional aspect (as indicated by the dashed lines of block 1010), method 1000 may include, at block 1010, transmitting an SIB over at least one resource block of the set of cell-specific SIB transmission resource blocks during the subframe. In an aspect, block 1010 may be performed by transmission component 1306 of FIG. 13. In an aspect, for example, cell grouping component 1204 may execute SIB resource block selection component 1208 to transmit an SIB over at least one resource block of the set of cell-specific SIB transmission resource blocks during the subframe.

Figure 11:
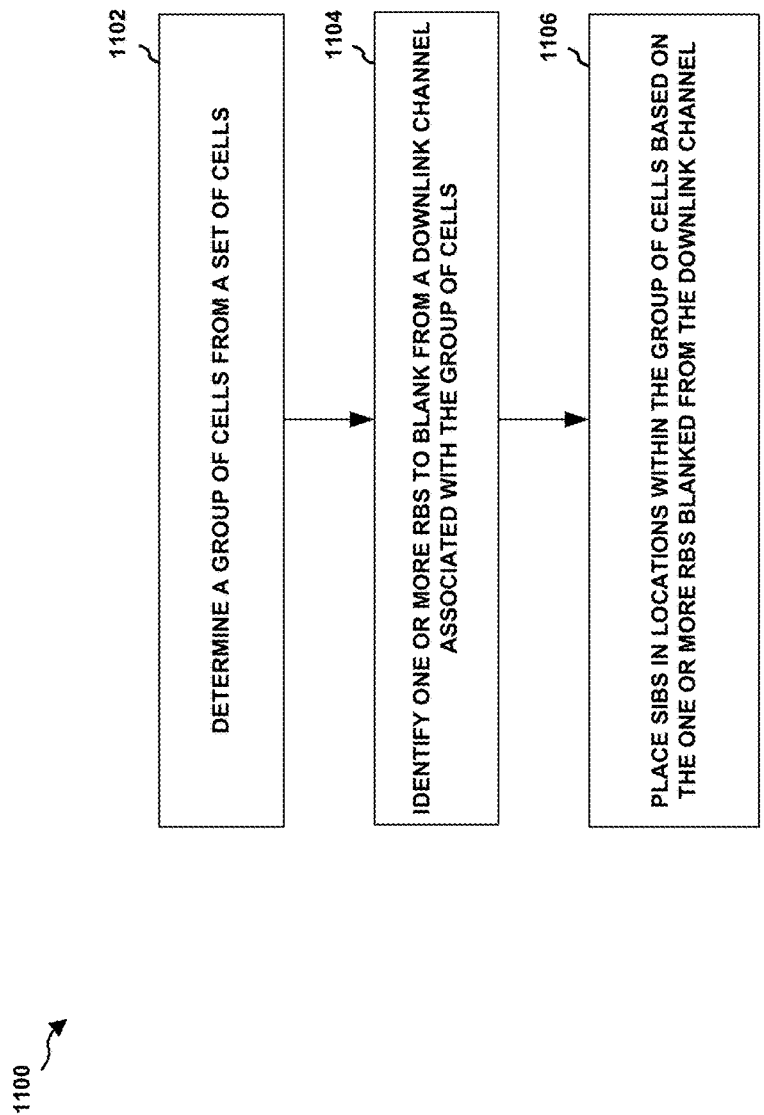
FIG. 11 is a flow chart of another method of SIB management during wireless communication.

Referring to FIGS. 11 and 12, a network entity (e.g., an eNB, eNodeB, coordinated controller device) or a component of the network entity, such as, but not limited to, SIB management component 602 of FIGS. 1, 2, 6 and 11 may perform an aspect of a method 1000 for managing SIB using SIB resource blocks allocation, and PDSCH data resource block blanking. While, for purposes of simplicity of explanation, the method is shown and described as a series of acts, it is to be understood and appreciated that the method is not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In an aspect, at block 1102, method 1100 may include determining a group of cells from a set of cells. For example, in an aspect, SIB management component 602, and/or cell grouping component 1204 may determine a group of cells from a set of cells.

In an aspect, at block 1104, method 1100 may include identifying one or more RBs to blank from a downlink channel associated with the group of cells. For example, in an aspect, SIB management component 602 may identify one or more RBs to blank from a downlink channel associated with the group of cells.

In an aspect, at block 1106, method 1100 may include placing SIBs in locations within the group of cells based on the one or more RBs blanked from the downlink channel. For example, in an aspect, SIB management component 602 may place SIBs in locations within the group of cells based on the one or more RBs blanked from the downlink channel.

Figure 13:
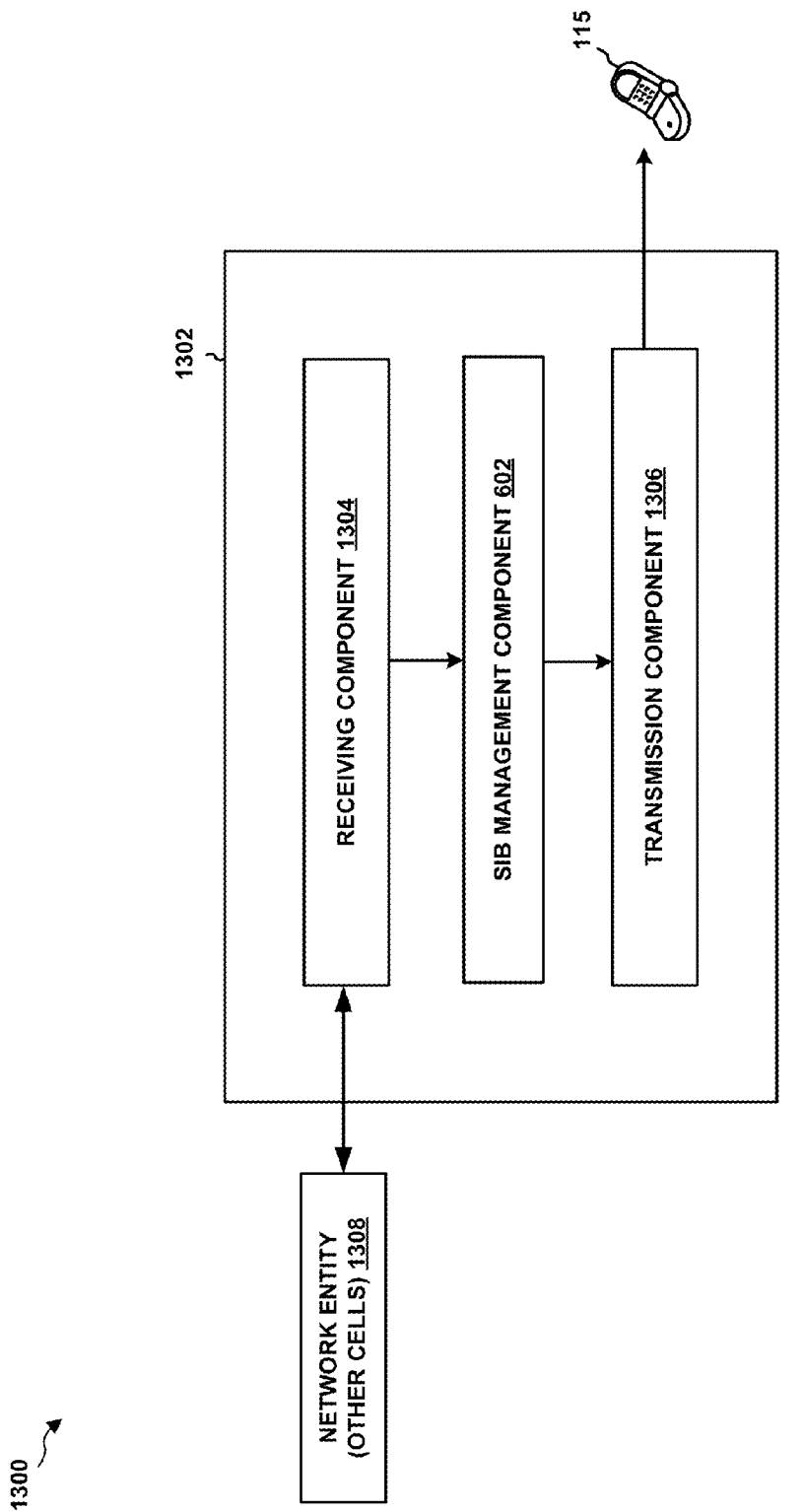
FIG. 13 is a conceptual data flow diagram illustrating the data flow between different modules/means/components in an example of apparatus.

FIG. 13 is a conceptual data flow diagram 1300 illustrating the communication between different modules/means/components in an example apparatus 1302. The apparatus may be a network entity, such as, but not limited to, network entity 704 of FIG. 7. The apparatus includes a receiving component 1304 that is configured to receive data (e.g., sent to apparatus 1302 by other network entities 1308 and/or UEs 115), SIB management component 602 (see, e.g., FIG. 12), and a transmission component 1306.

The apparatus may include additional modules that perform each of the functions of the algorithm in the aforementioned flow charts of FIGS. 10 and 11. As such, each step in the aforementioned flow charts of FIGS. 10 and 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
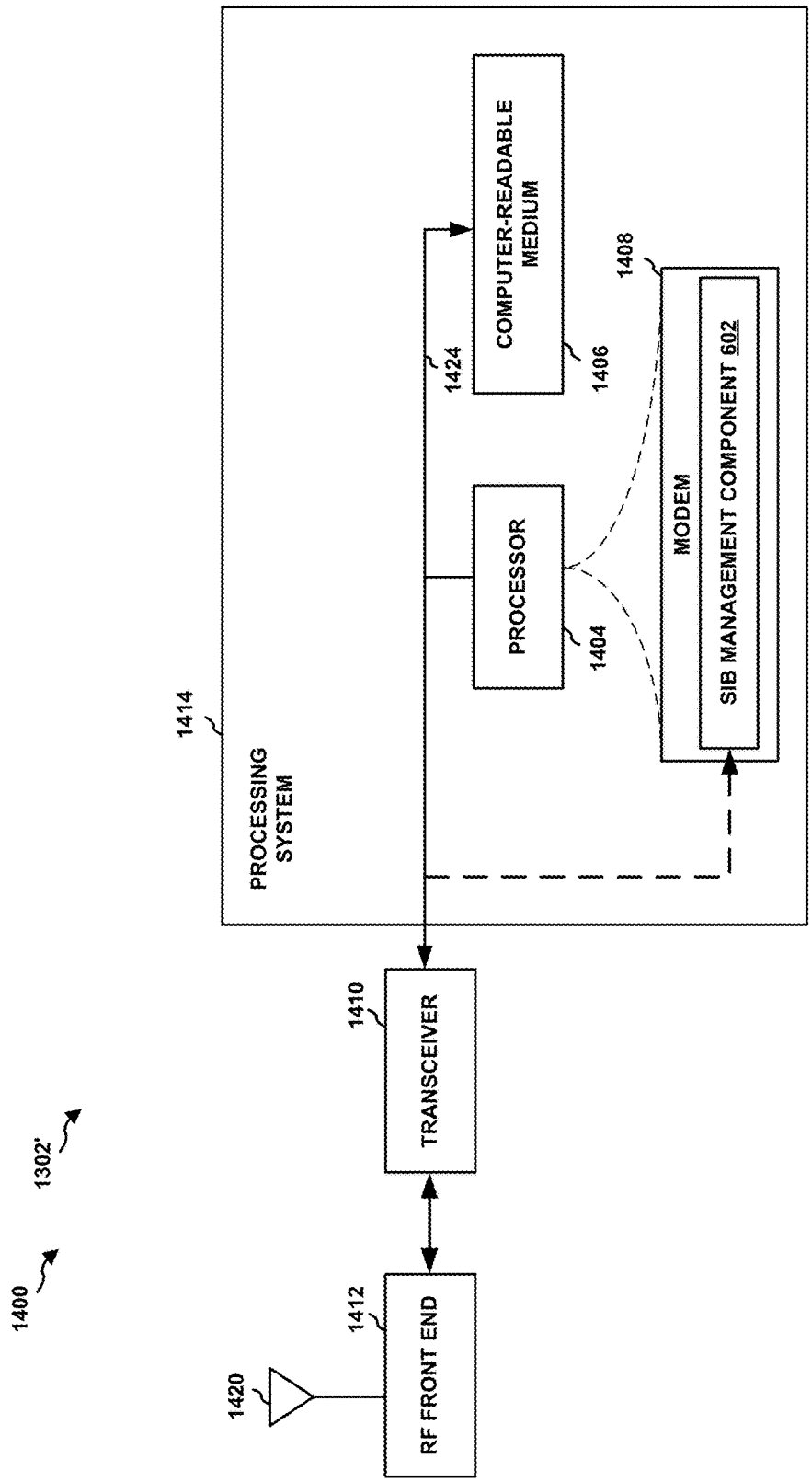
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414 and SIB management component 1408, which may be the same as or similar to SIB management component 602 (FIG. 12). The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404 including a modem 1408, optionally the SIB management component 602 (see, e.g., FIG. 12), and the computer-readable medium 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to an RF front end 1412 which is coupled to one or more antennas 1420. The transceiver 1410 provides a means for communicating with various other apparatus over a transmission medium. In an aspect, transceiver 1410 may include at least one transmitter and at least one receiver. For example, transceiver 1410 may include receiver for receiving one or more signals transmitted by a network entity. For example, transceiver 1410 may include transmitter and communicate with modem 1408 to transmit messages generated by SIB management component 602 and to receive messages and forward them to SIB management component 602.

RF front end 1412 may be connected to one or more antennas 1420 and can include one or more low-noise amplifiers (LNAs), one or more switches, one or more power amplifiers (PAs), and one or more filters for transmitting and receiving RF signals on the uplink channels and downlink channels. In an aspect, components of RF front end 1412 can connect with transceiver 1410. Transceiver 1410 may connect to one or more modems 1408 and processor 1404 via bus 1424.

In an aspect, LNA can amplify a received signal at a desired output level. In an aspect, each LNA may have a specified minimum and maximum gain values. In an aspect, RF front end 1412 may use one or more switches to select a particular LNA and its specified gain value based on a desired gain value for a particular application.

Further, for example, one or more PA(s) may be used by RF front end 1412 to amplify a signal for an RF output at a desired output power level. In an aspect, each PA may have a specified minimum and maximum gain values. In an aspect, RF front end 1412 may use one or more switches to select a particular PA and its specified gain value based on a desired gain value for a particular application.

Also, for example, one or more filters can be used by RF front end 1412 to filter a received signal to obtain an input RF signal. Similarly, in an aspect, for example, a respective filter can be used to filter an output from a respective PA to produce an output signal for transmission. In an aspect, each filter can be connected to a specific LNA and/or PA. In an aspect, RF front end 1412 can use one or more switches to select a transmit or receive path using a specified filter, LNA, and/or PA, based on a configuration as specified by transceiver 1410 and/or processor 1404.

Transceiver 106 may be configured to transmit and receive wireless signals through antenna 102 via RF front end 104. In an aspect, transceiver may be tuned to operate at specified frequencies such that a UE can communicate with, for example, a network entity. In an aspect, for example, modem 1408 can configure transceiver 1410 to operate at a specified frequency and power level based on the UE configuration of the network entity and communication protocol used by modem 1408.

The processing system 1414 includes a processor 1404, modem 1408 coupled to a computer-readable medium 1406. The processor 1404 is responsible for general processing, including the execution of software stored on the computer-readable medium 1406. The software, when executed by the processor 1404, causes the processing system 1414 to perform the various functions described supra for any particular apparatus. In an aspect, modem 1408 can be a multiband-multimode modem, which can process digital data and communicate with transceiver 1410 such that the digital data is sent and received using transceiver 106. In an aspect, modem 1408 can be multiband and be configured to support multiple frequency bands for a specific communications protocol. In an aspect, modem 1408 can be multimode and be configured to support multiple operating networks and communications protocols. In an aspect, modem 1408 can control one or more components of apparatus 1302' (e.g., RF front end 1412, transceiver 1410) to enable transmission and/or reception of signals from the network based on a specified modem configuration. In an aspect, the modem configuration can be based on the mode of the modem and the frequency band in use. The computer-readable medium 1406 may also be used for storing data that is manipulated by the processor 1404 when executing software. The processing system further includes at least one of SIB management component 602 (see, e.g., FIG. 12). In another aspect, SIB management component 602 may be configured to be implemented separately from the processor 1404 and/or modem 1408. The modules/components may be software modules running in the processor 1404, resident/stored in the computer readable medium 1406, one or more hardware modules coupled to the processor 1404, or some combination thereof. The processing system 1414 may be a component of a network entity, such as the eNB 610, and may include the memory 676 and/or at least one of the TX processor 616, the RX processor 670, and the controller/processor 675.

As described supra, the processing system 1414 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 15:
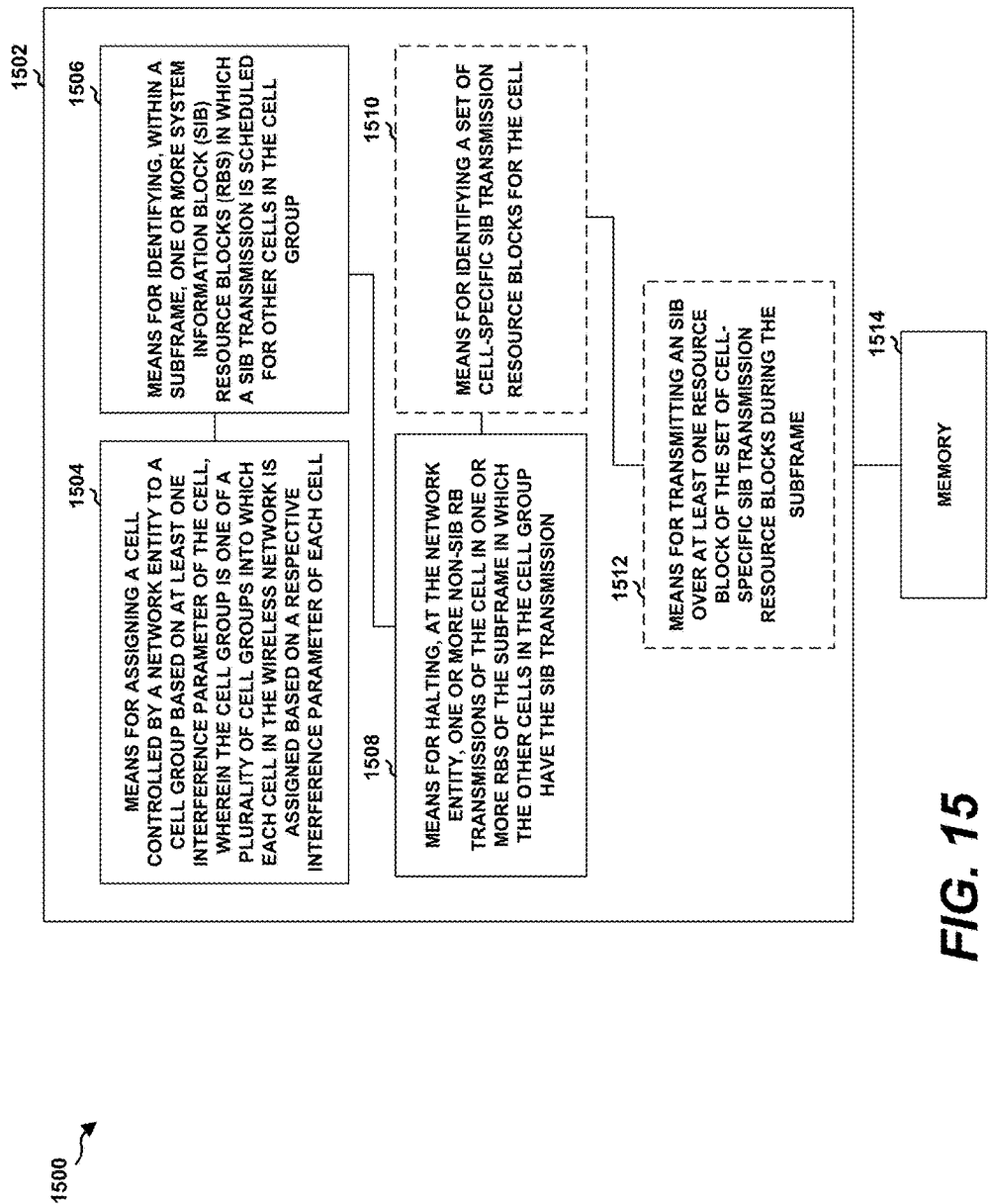
FIG. 15 illustrates a system for SIB management in accordance with an aspect of the present disclosure, e.g., according to FIG. 10.

With reference to FIG. 15, illustrated is a system 1500 for managing SIBs using SIB resource blocks allocation, and PDSCH data resource block blanking. For example, system 1500 can reside at least partially within a base station, network entity, etc. It is to be appreciated that system 1500 is represented as including functional blocks, which can be functional blocks that represent functions implemented by a processor, software, or combination thereof (e.g., firmware). System 1500 includes a logical grouping 1502 of means that can act in conjunction. For instance, logical grouping 1502 can include means for assigning a cell controlled by a network entity to a cell group based on at least one interference parameter of the cell, wherein the cell group is one of a plurality of cell groups into which each cell in the wireless network is assigned based on a respective interference parameter of each cell 1504. For example the means for assigning may be performed by cell grouping component 1204 (FIG. 6). Further, logical grouping 1502 can comprise means for identifying, within a subframe, one or more SIB RBs in which a SIB transmission is scheduled for other cells in the cell group 1506. For example, the means for identifying may be performed by transmission halting component 1206 (FIG. 12). Moreover, logical grouping 1502 can comprise means for halting, at the network entity, one or more non-SIB RB transmissions of the cell in the identified one or more SIB RBs in the subframe in which the SIB transmission is scheduled for the other cells in the cell group 1508. For example, the means for halting may be performed by transmission halting component 1206. Additionally, logical grouping 1502 can optionally comprise means for identifying a set of cell-specific SIB transmission resource blocks for the cell 1510. For example, the means for identifying may be performed by SIB resource block selection component 1208. Logical grouping 1502 can optionally comprise means for transmitting an SIB over at least one resource block of the set of cell-specific SIB transmission resource blocks during the subframe 1512. For example, the means for Thus, as described, system 1500 management of SIBs. Additionally, system 1500 can include a memory 1514 that retains instructions for executing functions associated with the means 1504, 1506, 1508, 1510, and 1512. While shown as being external to memory 1514, it is to be understood that one or more of the means 1504, 1506, 1508, 1510, and 1512 can exist within memory 1514.

Figure 16:
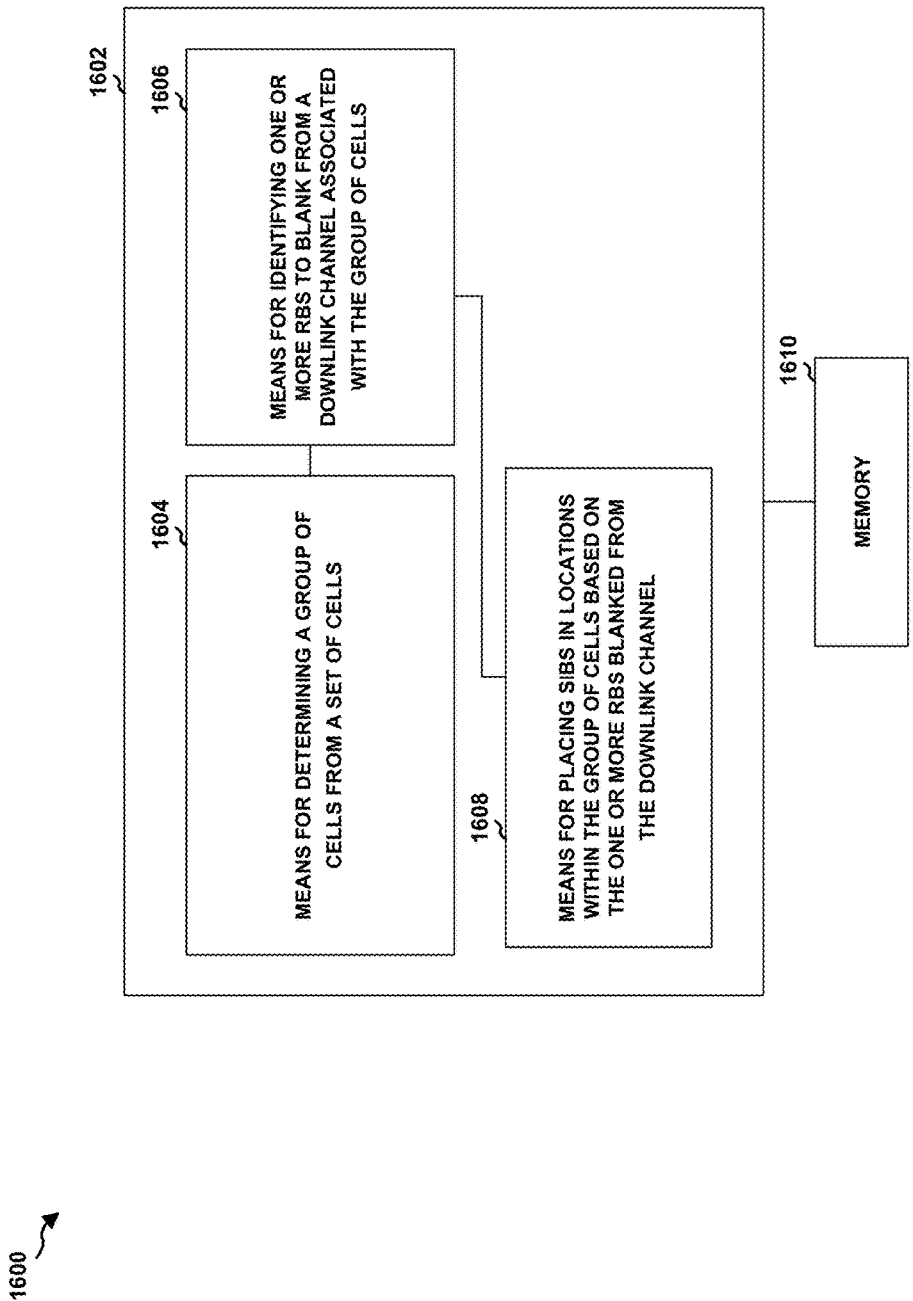
FIG. 16 illustrates a system for SIB management in accordance with an aspect of the present disclosure, e.g., according to FIG. 11.

With reference to FIG. 16, illustrated is a system 1600 for managing SIBs. For example, system 1600 can reside at least partially within a base station, network entity, etc. It is to be appreciated that system 1600 is represented as including functional blocks, which can be functional blocks that represent functions implemented by a processor, software, or combination thereof (e.g., firmware). System 1600 includes a logical grouping 1602 of means that can act in conjunction. For instance, logical grouping 1602 can include means for determining a group of cells from a set of cells 1604. Further, logical grouping 1602 can comprise means for identifying one or more RBs to blank from a downlink channel associated with the group of cells 1606. Moreover, logical grouping 1602 can comprise means for placing SIBs in locations within the group of cells based on the one or more RBs blanked from the downlink channel 1608. Thus, as described, system 1600 management of SIBs. Additionally, system 1600 can include a memory 1614 that retains instructions for executing functions associated with the means 1604, 1606, 1608, 1610, and 1612. While shown as being external to memory 1614, it is to be understood that one or more of the means 1604, 1606, 1608, 1610, and 1612 can exist within memory 1614.

It is understood that the specific order or hierarchy of functions in the processes disclosed (e.g., method 1000 of FIG. 10 and method 1100 of FIG. 11) is an illustration of an example of approaches. Based upon design preferences, it is understood that the specific order or hierarchy of functions in the processes may be rearranged. Further, some functions may be combined or omitted. The accompanying method claims present elements of the various functions in a sample order, and are not meant to be limited to the specific order or hierarchy presented.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
    assigning a cell controlled by a network entity to a cell group based on at least one interference parameter of the cell, wherein the cell group is one of a plurality of cell groups into which each cell in a wireless network is assigned based on a respective interference parameter of each cell;
    identifying, within a scheduled subframe for the cell group, one or more system information block (SIB) resource blocks (RBs) in which a SIB transmission is scheduled for one or more cells other than the cell in the cell group; and
    halting, at the network entity, one or more non-SIB RB transmissions of the cell in the identified one or more SIB RBs in the subframe in which the SIB transmission is scheduled for the one or more cells other than the cell in the cell group.

2. The method of claim 1, wherein assigning the cell comprises:

executing, at the network entity and in conjunction with one or more other network entities corresponding to one or more other cells of a set of cells, a coordinated cell grouping algorithm configured to determine the plurality of cell groups based on the at least one interference parameter.

3. The method of claim 2, wherein executing the coordinated cell grouping algorithm further comprises:
measuring, at the network entity, one or more cell-specific interference level values corresponding to the one or more other cells of the set of cells;
determining a strongest interfering cell based on the one or more cell-specific interference level values; and
reporting the strongest interfering cell to the one or more other cells of the set of cells, wherein grouping the cell further comprises grouping the cell based on the strongest interfering cell.

4. The method of claim 2, further comprising generating an updated plurality of cell groups based on at least one updated interference parameter by periodically reexecuting, at the network entity and in conjunction with the one or more other network entities corresponding to the one or more other cells of the set of cells, the coordinated cell grouping algorithm in order to periodically determine the updated plurality of cell groups.

5. The method of claim 1, wherein determining the cell group comprises receiving a cell group identification corresponding to the cell group from a centralized controlling device associated with the set of cells.

6. The method of claim 1, wherein the at least one interference parameter comprises one or more of a proximity of the cell to a neighboring cell, a handover count from one cell to another cell, a signal-to-noise ratio between the cell and the neighboring cell, or a reference signal received power from the one or more cells other than the cell in the cell group, or some combination thereof.

7. The method of claim 1, wherein identifying, within the subframe, the one or more SIB RBs comprises:
determining that a number of SIB RBs is greater than a threshold number, wherein the number of SIB RBs corresponds to a sum of one or more SIB RBs over which the SIB transmission is scheduled during the subframe for the cell;
determining that a set of top interfering cells in the cell group includes the cell based on one or more interference parameters corresponding to each cell in the cell group; and
wherein halting the one or more non-SIB RB transmissions of the cell comprises halting one or more scheduled non-SIB RB transmissions for the cell that collide with one or more SIB RBs of one or more cells in the cell group in the subframe.

8. The method of claim 1, wherein identifying, within the subframe, the one or more SIB RBs comprises:
determining that a number of SIB resource blocks is less than or equal to a threshold number, wherein the number of SIB RBs corresponds to a sum of one or more SIB RBs over which the SIB transmission is scheduled during the subframe for the cell; and
wherein halting the one or more non-SIB RB transmissions of the cell comprises halting one or more scheduled non-SIB RB transmissions for the cell that collide with one or more SIB RBs of one or more cells in the cell group in the subframe.

9. The method of claim 1, further comprising:
identifying a set of cell-specific SIB transmission resource blocks for the cell; and
transmitting a SIB over at least one resource block of the set of cell-specific SIB transmission resource blocks during the subframe.

10. The method of claim 9, wherein identifying the set of cell-specific SIB transmission resource blocks for the cell comprises:
calculating, based on a plurality of sub-band Channel Quality Indicator (CQI) reports, a plurality of sub-band interference levels corresponding to a plurality of corresponding sub-bands;
determining a set of optimal SIB transmission resource blocks based on the plurality of sub-band interference levels; and
performing a conflict resolution procedure with a network entity of at least one other cell of the cell group where at least one of the set of optimal SIB transmission resource blocks is an optimal SIB transmission resource block of another cell of the cell group and schedule the set of cell-specific SIB transmission resource blocks.

11. The method of claim 9, further comprising re-obtaining the set of cell-specific SIB transmission resource blocks for the cell according to a period to account for changing channel conditions.

12. The method of claim 1, wherein the one or more non-SIB RB transmissions is fixed over a plurality of subframes for the cell and for each other cell of the cell group.

13. The method of claim 1, wherein the one or more non-SIB RB transmissions is fixed over a plurality of subframes for the cell and for each other cell of a set of cells.

14. An apparatus for wireless communication, comprising:
means for assigning a cell controlled by a network entity to a cell group based on at least one interference parameter of the cell, wherein the cell group is one of a plurality of cell groups into which each cell in a wireless network is assigned based on a respective interference parameter of each cell;
means for identifying, within a scheduled subframe for the cell group, one or more system information block (SIB) resource blocks (RBs) in which a SIB transmission is scheduled for one or more cells other than the cell in the cell group; and
means for halting, at the network entity, one or more non-SIB RB transmissions of the cell in the identified one or more SIB RBs in the subframe in which the SIB transmission is scheduled for the one or more cells other than the cell in the cell group.

15. The apparatus of claim 14, wherein the means for assign the cell comprises:
means for executing, at the network entity and in conjunction with one or more other network entities corresponding to one or more other cells of a set of cells, a coordinated cell grouping algorithm configured to determine the plurality of cell groups based on the at least one interference parameter.

16. An apparatus for wireless communication, comprising:
a memory configured to store instructions, and
one or more processors communicatively coupled with the memory, wherein the one or more processors are configured to execute the instructions to:
assign a cell controlled by a network entity to a cell group based on at least one interference parameter of the cell, wherein the cell group is one of a plurality of cell groups into which each cell in a wireless network is assigned based on a respective interference parameter of each cell;

identify, within a scheduled subframe for the cell group, one or more system information block (SIB) resource blocks (RBs) in which a SIB transmission is scheduled for one or more cells other than the cell in the cell group; and halt, at the network entity, one or more non-SIB RB transmissions of the cell in the identified one or more SIB RBs in the subframe in which the SIB transmission is scheduled for the one or more cells other than the cell in the cell group.

17. The apparatus of claim 16, wherein the one or more processors configured to assign the cell are further configured to:

execute, at the network entity and in conjunction with one or more other network entities corresponding to one or more other cells of a set of cells, a coordinated cell grouping algorithm configured to determine the plurality of cell groups based on the at least one interference parameter.

18. The apparatus of claim 17, wherein the one or more processors configured to execute the coordinated cell grouping algorithm are further configured to:

measure, at the network entity, one or more cell-specific interference level values corresponding to the one or more other cells of the set of cells;

determine a strongest interfering cell based on the one or more cell-specific interference level values; and report the strongest interfering cell to the one or more other cells of the set of cells, wherein grouping the cell further comprises grouping the cell based on the strongest interfering cell.

19. The apparatus of claim 17, further comprising generating an updated plurality of cell groups based on at least one updated interference parameter by periodically reexecuting, at the network entity and in conjunction with the one or more other network entities corresponding to the one or more other cells of the set of cells, the coordinated cell grouping algorithm in order to periodically determine the updated plurality of cell groups.

20. The apparatus of claim 16, wherein the one or more processors configured to determine the cell group are further configured to receive a cell group identification corresponding to the cell group from a centralized controlling device associated with the set of cells.

21. The apparatus of claim 16, wherein the at least one interference parameter comprises one or more of a proximity of the cell to a neighboring cell, a handover count from one cell to another cell, a signal-to-noise ratio between the cell and the neighboring cell, or a reference signal received power from the one or more cells other than the cell in the cell group, or some combination thereof.

22. The apparatus of claim 16, wherein the one or more processors configured to identify, within the subframe, the one or more SIB RBs are further configured to:

determine that a number of SIB RBs is greater than a threshold number, wherein the number of SIB RBs corresponds to a sum of one or more SIB RBs over which the SIB transmission is scheduled during the subframe for the cell;

determine that a set of top interfering cells in the cell group includes the cell based on one or more interference parameters corresponding to each cell in the cell group; and wherein halting the one or more non-SIB RB transmissions of the cell comprises halting one or more scheduled non-SIB RB transmissions for the cell that collide with one or more SIB RBs of one or more cells in the cell group in the subframe.

23. The apparatus of claim 16, wherein the one or more processors configured to identify, within the subframe, the one or more SIB RBs are further configured to:

determine that a number of SIB RBs is less than or equal to a threshold number, wherein the number of SIB RBs corresponds to a sum of one or more SIB RBs over which the SIB transmission is scheduled during the subframe for the cell; and wherein halting the one or more non-SIB RB transmissions of the cell comprises halting one or more scheduled non-SIB RB transmissions for the cell that collide with one or more SIB RBs of one or more cells in the cell group in the subframe.

24. The apparatus of claim 16, wherein the one or more processors are further configured to:

identify a set of cell-specific SIB transmission resource blocks for the cell; and transmit a SIB over at least one resource block of the set of cell-specific SIB transmission resource blocks during the subframe.

25. The apparatus of claim 24, wherein the one or more processors configured to identify the set of cell-specific SIB transmission resource blocks for the cell are further configured to:

calculate, based on a plurality of sub-band Channel Quality Indicator (CQI) reports, a plurality of sub-band interference levels corresponding to a plurality of corresponding sub-bands;

determine a set of optimal SIB transmission resource blocks based on the plurality of subband interference levels; and perform a conflict resolution procedure with a network entity of at least one other cell of the cell group where at least one of the set of optimal SIB transmission resource blocks is an optimal SIB transmission resource block of another cell of the cell group and schedule the set of cell-specific SIB transmission resource blocks.

26. The apparatus of claim 24, wherein the one or more processors are further configured to re-obtain the set of cell-specific SIB transmission resource blocks for the cell according to a period to account for changing channel conditions.

27. The apparatus of claim 16, wherein the one or more non-SIB RB transmissions is fixed over a plurality of subframes for the cell and for each other cell of the cell group.

28. The apparatus of claim 16, wherein the one or more non-SIB RB transmissions is fixed over a plurality of subframes for the cell and for each other cell of a set of cells.

29. A non-transitory computer-readable medium storing computer executable code executable by a processor for wireless communication, comprising:

code for assigning a cell controlled by a network entity to a cell group based on at least one interference parameter of the cell, wherein the cell group is one of a plurality of cell groups into which each cell in a wireless network is assigned based on a respective interference parameter of each cell;

code for identifying, within a scheduled subframe for the cell group, one or more system information block (SIB) resource blocks (RBs) in which a SIB transmission is scheduled for one or more cells other than the cell in the cell group; and code for halting, at the network entity, one or more non-SIB RB transmissions of the cell in the identified one or more SIB RBs in the subframe in which the SIB transmission is scheduled for the one or more cells other than the cell in the cell group.

30. The computer-readable medium of claim 29, wherein the code for assign the cell comprises:

code for executing, at the network entity and in conjunction with one or more other network entities corresponding to one or more other cells of a set of cells, a coordinated cell grouping algorithm configured to determine the plurality of cell groups based on the at least one interference parameter.

* * * * *